US011079923B1

(12) United States Patent
Hofmann

(10) Patent No.: US 11,079,923 B1
(45) Date of Patent: Aug. 3, 2021

(54) USER INTERFACE FOR A VIDEO CAPTURE DEVICE

(71) Applicant: Twitter, Inc., San Francisco, CA (US)

(72) Inventor: Dominik Hofmann, Brooklyn, NY (US)

(73) Assignee: Twitter, Inc., San Francisco, CA (US)

( * ) Notice: Subject to any disclaimer, the term of this patent is extended or adjusted under 35 U.S.C. 154(b) by 0 days.

(21) Appl. No.: 16/781,290

(22) Filed: Feb. 4, 2020

Related U.S. Application Data

(63) Continuation of application No. 14/201,435, filed on Mar. 7, 2014, now Pat. No. 10,592,089, which is a continuation of application No. 13/851,037, filed on Mar. 26, 2013, now abandoned.

(60) Provisional application No. 61/719,365, filed on Oct. 26, 2012.

(51) Int. Cl.
*G06F 3/00* (2006.01)
*G06F 3/0485* (2013.01)
*G06F 3/0482* (2013.01)

(52) U.S. Cl.
CPC .......... *G06F 3/0485* (2013.01); *G06F 3/0482* (2013.01)

(58) Field of Classification Search
CPC .............................. G06F 3/0485; G06F 3/0482
See application file for complete search history.

(56) References Cited

U.S. PATENT DOCUMENTS

| 7,483,061 B2 | 1/2009 | Fredlund et al. |
| 8,798,598 B2 | 8/2014 | Rossmann |
| 9,652,141 B2 | 5/2017 | Mak |
| 9,992,470 B1 | 6/2018 | Hofmann |
| 2004/0218894 A1 | 11/2004 | Harville et al. |
| 2004/0242266 A1 | 12/2004 | Tagliabue et al. |
| 2006/0090141 A1* | 4/2006 | Loui ............ G06F 16/447 715/764 |
| 2006/0224940 A1 | 10/2006 | Lee |
| 2007/0024734 A1 | 2/2007 | Headley et al. |
| 2009/0150797 A1 | 6/2009 | Burkholder et al. |
| 2009/0210793 A1* | 8/2009 | Yee .............. G06F 16/58 715/723 |
| 2012/0046770 A1* | 2/2012 | Becker ......... H04N 21/41407 700/94 |
| 2012/0236201 A1 | 9/2012 | Larsen et al. |
| 2013/0039157 A1 | 2/2013 | Waites et al. |
| 2013/0080895 A1* | 3/2013 | Rossman ........ G06F 3/04883 715/720 |
| 2013/0094829 A1 | 4/2013 | Yang et al. |
| 2015/0269969 A1* | 9/2015 | DeYonker ......... G11B 27/34 386/241 |

* cited by examiner

*Primary Examiner* — Frank F Huang
(74) *Attorney, Agent, or Firm* — Brake Hughes Bellermann LLP

(57) ABSTRACT

A method and system for capturing, sharing, viewing, and/or displaying one or more videos. A user of a computing device performs a gesture involving contacting a touch sensitive display. In response, a video segment is captured while the user maintains contact with the touch sensitive display. Upon releasing contact with the touch sensitive display, recording of the video segment is ceased. In one or more embodiments of the invention, the user may then record one or more additional video segments to be included in a video vignette.

20 Claims, 15 Drawing Sheets

USER INTERFACE FOR A VIDEO CAPTURE DEVICE

CROSS-REFERENCE TO RELATED APPLICATIONS

This application is a continuation of, and claims priority to, U.S. patent application Ser. No. 14/201,435, filed Mar. 7, 2014 and entitled "CAPTURE, SHARING, AND DISPLAY OF A PERSONAL VIDEO VIGNETTE," which is a continuation of U.S. patent application Ser. No. 13/851,037, filed on Mar. 26, 2013, entitled "CAPTURE, SHARING, AND DISPLAY OF A PERSONAL VIDEO VIGNETTE," both of which are non-provisionals of U.S. Provisional Application No. 61/719,365, filed Oct. 26, 2012, and entitled "PERSONAL VIDEO VIGNETTE." The disclosures of U.S. patent application Ser. No. 14/201,435, U.S. patent application Ser. No. 13/851,037, and U.S. Provisional Application No. 61/719,365 are incorporated by reference herein in their entireties.

BACKGROUND

Current video sharing technologies allow users to record and share videos from their mobile device within seconds. Social media networks allow for the sharing of videos and other user-generated content globally and in real time. As the video and multi-media capability of mobile devices expands, users are able to capture and share better quality videos faster and more efficiently.

User interfaces for capturing and sharing videos are also evolving. Better quality touch sensitivity and higher resolutions in display devices has led to the development of a variety of new methods of user interaction. For example, multi-touch gestures have become prevalent in mobile applications on a variety of devices. Also, facial recognition technology has led to easier tagging and identification of images and videos.

This combination of advancing hardware and software technologies has led to a vast increase in user engagement with videos and other media on the web.

SUMMARY

In general, in one aspect, the invention relates to a method for video capture. The method includes: detecting a gesture performed by a user on a touch sensitive display; initiating recording of a video in response to detecting the gesture, wherein the recording continues while the user maintains contact with the touch sensitive display; detecting that the user has released contact with the touch sensitive display; and stopping recording of the video in response to detecting that the user has released contact.

In general, in one aspect, the invention relates to a mobile device. The mobile device includes: a computer processor; a user interface module executing on the computer processor and configured to detect a gesture performed by a user on a touch sensitive display, and detect that the user has released contact with the touch sensitive display; and an application module executing on the computer processor and configured to initiate recording of a video in response to detecting the gesture, wherein the recording continues while the user maintains contact with the touch sensitive display; and stop recording of the video in response to detecting that the user has released contact.

In general, in one aspect, the invention relates to a non-transitory computer readable medium comprising instructions for video capture. The instructions include functionality to execute on at least one computer processor to enable the computer processor to: detect a gesture performed by a user on a touch sensitive display; initiate recording of a video in response to detecting the gesture, wherein the recording continues while the user maintains contact with the touch sensitive display; detect that the user has released contact with the touch sensitive display; and stop recording of the video in response to detecting that the user has released contact.

In general, in one aspect, the invention relates to a system for sharing a video vignette. The system includes a computer processor and a remote processing module executing on the computer processor and configured to: receive a first video from a first mobile device, wherein the first video is posted to a first account of a social media platform; receive a second video from a second mobile device, wherein the second video is posted to a second account of the social media platform; combine the first video and the second video into a looping video vignette; and share the looping video vignette with a plurality of connected accounts of the social media platform having a predefined graph relationship with one selected from a group consisting of the first account and the second account.

Other aspects of the invention will be apparent from the following description and the appended claims.

DETAILED DESCRIPTION

Figure 1:
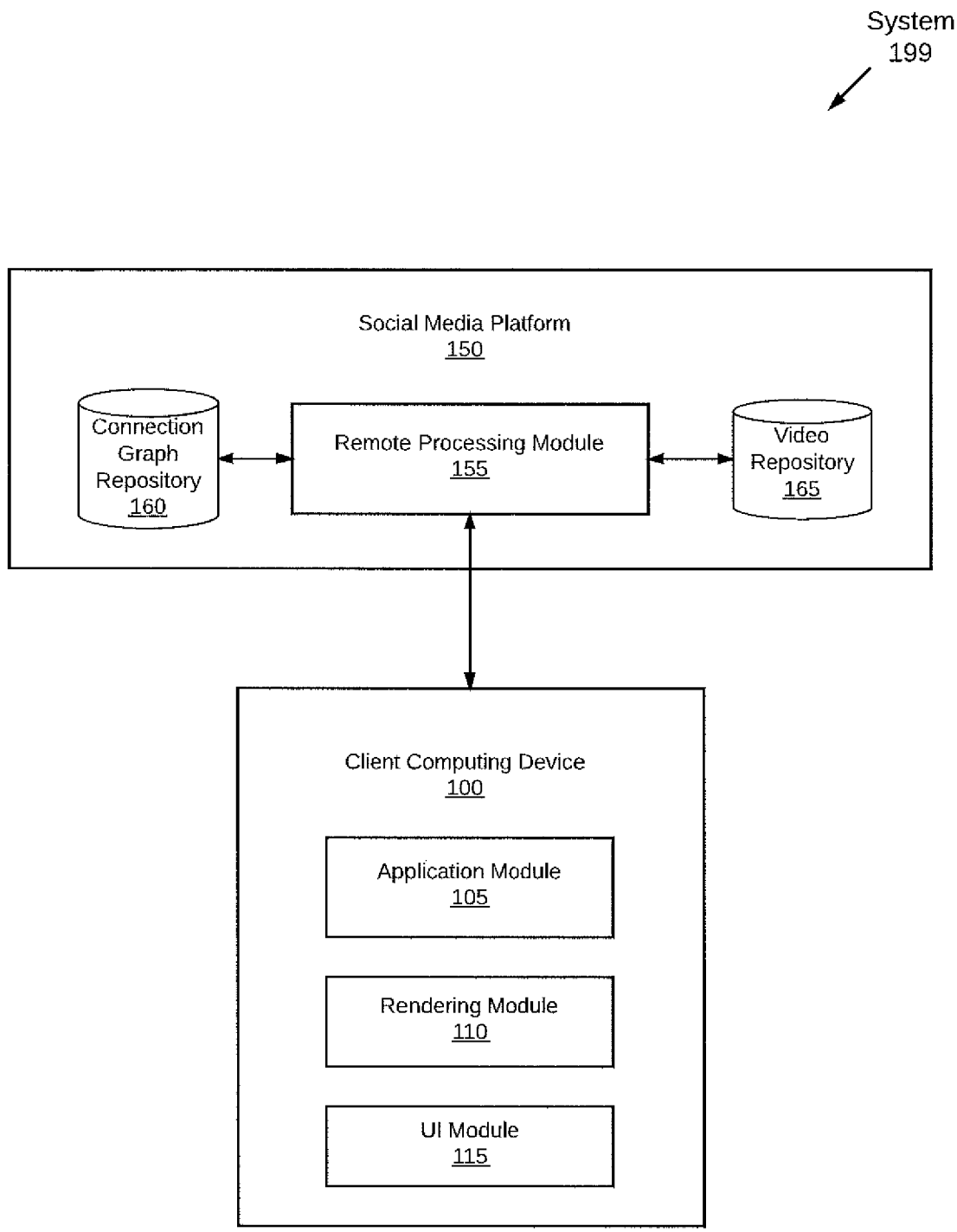
FIG. 1 shows a schematic diagram of a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for capturing, sharing, viewing, and/or displaying one or more video segments. A user of a computing device performs a gesture involving contacting a touch sensitive display. In response, a video segment is captured while the user maintains contact with the touch sensitive display. Upon releasing contact with the touch sensitive display, the recording for that segment is ceased. In one or more embodiments of the invention, the user then proceeds to record one or more additional segments of a video vignette (e.g., using the same hold-and-release gesture). Upon reaching a predefined length threshold, the video vignette is finalized.

FIG. 1 shows a system (199) in accordance with one or more embodiments of the invention. As shown in FIG. 1, the system (199) has multiple components including a social media platform (150) and a client computing device (100) with an application module (105), a rendering module (110), and a user interface (UI) module (115). Various components of the system (199) may be located on the same device (e.g., a server, mainframe, personal computer (PC), and any other device) or may be located on separate devices connected by a network (e.g. a local area network (LAN), the Internet, etc.), with wired and/or wireless segments. Those skilled in the art will appreciate that there may be more than one of each separate component running on a device, as well as any combination of these components within a given embodiment of the invention.

For purposes of this disclosure, a video vignette may refer to a video including one or more contiguous segments. Video vignette can refer to a single video including separately recorded segments or can refer to a set of separate but related video segments. The segments may be captured at separate locations and/or times, by the same or separate recording devices (e.g., a smartphone). In one or more embodiments of the invention, the video vignette has a maximum length (e.g., 6 seconds) and/or is designed for looped/continuous playback.

For purposes of this disclosure, a video segment can refer to any video or portion of video. For example, a video segment can refer to a standalone video, a segment of a video vignette, or any other portion of video, in accordance with various embodiments of the invention. Thus, while some embodiments of the invention are discussed specifically with regard to video vignettes (for purposes of example), the disclosed systems and methods can be applied more generally to any type of video segment.

In one or more embodiments of the invention, the UI module (115) includes functionality to detect a gesture performed by a user on a touch sensitive display. Examples of a gesture may include, but are not limited to, a press and hold gesture, a selection gesture, a button press gesture, a swipe gesture, a pinch gesture, a multi-touch gesture (e.g., two finger press, press and swipe, two finger swipe, etc.), a tap gesture, a double tap gesture, a scroll gesture, and/or any other type of gesture, in accordance with various embodiments of the invention. For example, the UI module (115) may detect a gesture corresponding to a video capture command of a mobile application.

In one or more embodiments of the invention, the application module (105) includes functionality to begin recording a video segment in response to detecting the gesture. The recording may include a buffer amount of audio and/or video which is captured prior to detecting the gesture. In response to the gesture, the application module (105) may initiate a progress indicator to display an amount of remaining time until the maximum length of the video vignette is reached. The recording may be performed in H.264, SMPTE 421M, DivX, VP8, and/or any other format, in accordance with various embodiments of the invention. Furthermore, in one or more embodiments of the invention, the recording may be rendered using an animation-enabled image format such as graphics interchange format (GIF).

In one or more embodiments of the invention, the application module (105) includes functionality to record one or more audio and/or video buffers. The buffer may be a leading buffer (i.e., a buffer of recorded audio/video which is recorded immediately before the start of a video segment) or a trailing buffer (i.e., a buffer of recorded audio/video which continues recording immediately after the end of a video segment) and may correspond to a predefined length. For example, the application module (105) may enter a video capture mode in which a live stream from a camera (not shown) connected to or integrated within the client computing device (100) is displayed on a display screen of the client computing device (100). Upon entering the video capture mode, the application module (105) may begin recording a window of audio and/or video content to a buffer. In this example, the buffer may not be visible to the user, but may store a fixed length and/or size of video/audio to be used in rendering the final video vignette. In another example, the rendering module (110) is configured to use the buffer to perform cross fading audio signals from adjacent segments of the video vignette. The rendering module (110) may also use one or more buffers to apply transition effects from the last segment to the first segment, in order to provide a smoother transition in looped playback. In this way, audio and/or video from the buffer may be used for transition effects and/or other rendering functionality, in accordance with various embodiments of the invention.

In one or more embodiments of the invention, the application module (105) is configured to continue recording for as long as the user maintains contact with a touch sensitive display of the client computing device (100). Thus, for example, if the user of the client computing device (100) performs a press and hold gesture, the application module (105) may initiate recording of a video segment upon detecting contact with the touch sensitive display, and may continue recording into that segment for as long as contact is maintained, or until a predefined length threshold is reached.

In one or more embodiments of the invention, the UI module (115) includes functionality to detect that a user has released contact with a touch sensitive display. For example, a user of a mobile device may press and hold within a capture screen of a mobile application. In this example, the capture screen shows a live stream from a camera of the mobile device, and the gesture is performed by pressing and holding anywhere in the capture screen. The UI module (115) detects when the user has release contact with the display and notifies the application module (105) of the release event.

In one or more embodiments of the invention, the application module (105) includes functionality to stop recording the video segment. In the example above, the application module (105) receives a notification that the user has released contact with a touch sensitive display, and then ceases recording in response. Other user interface elements may be used to start and stop recording of the video segment, in accordance with various embodiments of the invention. For example, the UI module (115) may display a record button, or may interpret one or more gestures to start/stop recording.

In one or more embodiments of the invention, the application module (105) includes functionality to determined that the video vignette has reached one or more predefined length thresholds. For example, a predefined length threshold may be defined as a maximum allowed length. Upon, reaching the maximum length, the application module (105) may be configured to automatically finalize the video vignette (e.g., by rendering, post-processing, etc.) or may proceed to display a new user interface requesting permission from the user to finalize the video vignette. In another example, the length threshold may be a maximum range (i.e., a maximum range threshold). In this example, the application module (105) detects when the length of the video vignette enters a maximum range (e.g., 6-6.5 seconds). In one or more embodiments of the invention, if a user of the client computing device (100) stops recording within the maximum range, the application module (105) automatically finalizes the video vignette, or displays a new user interface requesting permission from the user to finalize the video vignette. In yet another example, the length threshold is a minimum allowable length. In this example, the application module (105) is configured to detect that a length of the video has exceeded the minimum allowable length. If it is determined that the length has exceeded the minimum, the application module (105) may be configured to enable an option to finalize the video. In this example, enabling the option may include displaying a UI element as an option to finalize the video vignette. Thus, the application module (105) may be configured to receive a request to finalize the video vignette before it reaches a maximum allowable length, but after it exceeds a minimum allowable length. Continuing the example, the application module (105) may then finalize the video vignette. In one or more embodiments of the invention, the length of the video vignette does not include the length of the recorded audio or video buffer, since the buffer will be used only for cross-fading and rendering purposes and will not add to the length of the final video vignette.

In one or more embodiments of the invention, the UI module (115) includes functionality to display a representation of an audio clip to a user and/or to receive a selection of a segment of audio from the user. The audio representation can be any indication of an audio source, including but not limited to, a uniform resource locator (URL) of an online video with associated audio, a local file stored on the client computing device (100), a waveform representation of a source audio clip, and/or any other representation of audio displayed in a user interface. The selection can correspond to an entire source audio clip or one or more sub-segments of the source audio. For example, a sliding window or a series of sliding windows can be overlayed onto a waveform representation of the source audio. The user can then move the sliding window and sample the corresponding segment of audio (e.g., played concurrently with the corresponding video). The UI module (115) can receive selection of a button or other UI element indicating that the audio selection is complete. For example, after moving the sliding window over the waveform representation and sampling the selected audio, the user may drag the sliding window of audio into a representation of a video to either (1) initiate concurrent playback of the selected audio and video, and/or (2) finalize audio selection and proceed to rendering the video with the selected audio segment(s).

In one or more embodiments of the invention, the rendering module (110) includes functionality to render the video vignette. Rendering may include compiling one or more recorded video segments into a final video vignette. In one or more embodiments of the invention, the rendering module (110) identifies an ordered list representing a desired order of one or more video segments in the final video vignette, then rendering the video vignette accordingly. The rendering module (110) may be configured to perform audio and/or video cross-fading in order to compile the video vignette. For example, the rendering module (110) may apply one or more user-selected video transition effects in order to create a transition between two adjacent segments of the video vignette. Examples of transition effects may include, but are not limited to, a video fade effect, a video dissolve effect, a video wipe effect, a video pan effect, and/or any combination thereof.

In one or more embodiments of the invention, the rendering module (110) includes functionality to perform audio cross fading between one or more segments of the video vignette. The rendering module may fade a first audio signal from a first segment with a second audio signal from a second segment to create a combined signal for an transitional portion of audio between the two segments. The rendering module (110) may modify the first signal (i.e., the signal from the preceding segment) over the transitional portion according to the formula $f_{new}=f_{orig}*[1-sqrt(t)]$, where $f_{new}$ is the resulting signal, $f_{orig}$ is the original signal, and t is time less than or equal to 1. The rendering module (110) may modify the second signal (i.e., the signal from the succeeding segment) over the transitional portion according to the formula $f_{new}=f_{orig}*sqrt(t)$, where $f_{new}$ is the resulting signal, $f_{orig}$ is the original signal, and t is time less than or equal to 1. The rendering module (110) generates a combined signal over the transitional portion by cross-fading the two modified signals. For example, the rendering module (110) computes the final signal F by a quadratic combination of the two signals. In this example, assuming 0 is the starting time and 1 is the finish time, $F=c(t)*B+(1-c(t))*A$, where $c(t)=sqrt(t)$ for t in [01]. In one or more embodiments of the invention, the preceding formulas may be normalized to allow for increasing or decreasing the transitional portion. Any other variation of these formulas may be used, in accordance with various embodiments of the invention. In one or more embodiments of the invention, when creating a transition between adjacent segments of a video vignette, the rendering module (110) obtains the first signal from an extra recording of the audio after the cut (i.e., the application module (105) continues recording a trailing buffer of audio after a user stops recording) and B is the audio of the new recording. In one or more embodiments of the invention, when creating a transition between a last segment and a first segment of a video vignette (in order to create the loop), the rendering module (110) obtains the second signal is the audio from a leading buffer (i.e., recorded before the user initiated recording of the first segment).

In one or more embodiments of the invention, the application module (105) includes functionality to upload the video vignette to the remote processing module (155). The application module (105) may initiate uploading of one or more segments of a pending video vignette, either concurrently with or prior to completing the rendering process. Thus, rendering may be performed by the client computing device (100), the remote processing module (155), or a combination of both, in accordance with various embodiments of the invention. The application module (105) may further be configured to begin uploading the video vignette in response to any number of triggers or events. For example, the application module (105) may be configured to begin uploading the video vignette in response to a user selecting an option to share the video vignette with one or more accounts of the social media platform (150). Alternatively, in another example, the application module (105) may be configured to begin uploading the video vignette upon detecting that the client computing device (100) is connected to a Wi-Fi network.

In one or more embodiments of the invention, the rendering module (110) includes functionality to apply one or more video filters to the pending video vignette. A video filter may be any combination of contrast, brightness, frame rate, resolution, effect(s), and/or other manipulation(s) of the video designed for artistic and/or quality appeal. For example, the rendering module (110) may apply a blur filter in response to a user selection. In another example, the rendering module (110) may apply a vintage filter designed to modify the aesthetics of one or more selected video segments.

In one or more embodiments of the invention, the rendering module (110) includes functionality to apply one or more audio filters to the pending video vignette. Examples of an audio filter may include but are not limited to, a noise reduction filter, a normalization filter, a musical effect filter, an entertainment effect filter, a voiceover filter, and/or any other modification of the audio. In one or more embodiments of the invention, the UI module (115) includes functionality to display one or more audio and/or video filters for selection on a display screen of the client computing device (e.g., by displaying one or more representative UI elements). In one or more embodiments of the invention, the UI module (115) is configured to display the filters while capturing a video segment, prior to rendering a video vignette, and/or during post-processing of a video vignette. The UI module (115) may receive a selection of one or more filters from the user, and the application module (105) may then apply the selected filters, in accordance with various embodiments of the invention.

In one or more embodiments of the invention, the UI module (115) includes functionality to display a live stream from a camera of the client computing device (100). The UI module (115) may be configured to display the live stream while in a capture mode of a software application executing on the client computing device (100). Capture mode may refer to any state in which the user is able to capture video using one or more inputs to the UI module (115). In one or more embodiments of the invention, the live stream is displayed concurrently with a representation of one or more recorded video segments of the video vignette.

In one or more embodiments of the invention, the rendering module (110) includes functionality to detect one or more audio and/or video triggers while displaying the live stream. An audio trigger may be any type of predefined audio input associated with a command. Examples of an audio trigger may include, but are not limited to, exceeding a predefined delta between one or more previously recorded audio signals (e.g., of recorded video segments) and a live streaming audio signal (e.g., of a current video segment), exceeding a baseline audio signal or frequency, a current audio frequency being below a threshold frequency, a current audio noise level exceeding a predefined threshold noise level, and/or any other criteria for recommending or applying one or more audio filters.

In one or more embodiments of the invention, the rendering module (110) includes functionality to display an option to apply one or more filters to the pending video vignette in response to an audio or video trigger. The rendering module (110) may be configured to display a tooltip or other UI element recommending one or more filters and/or indicating that one or more filters have been applied. In one or more embodiments of the invention, the UI module (115) is configured to display the UI element concurrently with a live video stream. The UI module (115) may further be configured to display the UI element either prior to, during, and/or after recording one or more video segments.

In one or more embodiments of the invention, the UI module (115) includes functionality to display a progress indicator associated with a length of the pending video vignette. The progress indicator may be a progress bar, a progress circle, a percentage complete indicator, and/or any other graphical, numerical, or descriptive indication of the current length of a pending video vignette relative to a maximum length of the video vignette. In one or more embodiments of the invention, the current length of the pending video vignette does not include one or more buffers (e.g., leading/trailing buffers). Furthermore, in one or more embodiments of the invention, the maximum length of the video vignette may refer to a beginning time of a maximum range threshold. Thus, in embodiments involving the use of a maximum range threshold, the UI module (115) may be configured to display the progress indicator relative to the beginning of the maximum range. In this way, the user may actually continue recording for a short duration (i.e., the duration of the maximum range) after completion of the progress bar. For example, if the maximum duration is 10-11 seconds, the UI module (115) may be configured to display the progress indicator relative to the 10 second time. In this way, the application module (105) may be configured to continue recording for 1 second after completion of the progress bar. Thus, in this example, if the user stops recording prior to 10 seconds, the current segment is saved and the UI module (115) provides the user with an option to continue recording for the currently pending video vignette (e.g., to record additional segment(s)). Also in this example, if the user stops recording between 10 and 11 seconds, the application module (105) automatically finalizes the video vignette or provides the user with an option to finalize the video vignette (i.e., no further recording is allowed for this pending video vignette). Continuing the example, if the user continues recording until 11 seconds, the recording ceases automatically at 11 seconds. In one or more embodiments of the invention, the additional but non-visible recording time of the maximum range threshold may prevent the final video segment from being prematurely truncated or from appearing rushed.

In one or more embodiments of the invention, the UI module (115) includes functionality to display a representation of a set of previously recorded video segments of a pending video vignette. The representation may be any UI element or combination of UI elements representing the one or more segments. Examples of the representation may include, but are not limited to, a sequence of thumbnails of the recorded segments displayed at fixed time intervals, an image montage including one or more thumbnails from the segments, a counter representing a number of recorded segments, a set of icons/graphics representing the recorded segments, and/or any other graphical depiction of one or more aspects of the recorded segments.

In one or more embodiments of the invention, the UI module (115) includes functionality to detect a user input corresponding to the representation. For example, the user may select a UI element of the representation or may perform a gesture associated with the recorded segments (e.g., a swipe in the direction of the representation, etc.). In another example, a user may select a thumbnail of one of the recorded segments.

In one or more embodiments of the invention, the UI module (115) includes functionality to display an ordered list of UI elements representing the recorded video segments. The ordered list may include thumbnails, stock images, icons, numbers, and/or any other placeholder representing each recorded segment. In this way, the UI module (115) may be configured to illustrate the number of currently recorded segments, a depiction of the content of each segment, a length of each segment, and/or any other attribute of one or more segments via the ordered list, in accordance with various embodiments of the invention.

In one or more embodiments of the invention, the UI module (115) includes functionality to detect an input associated with the ordered list. Examples of the input may include, but are not limited to, releasing contact with a touch sensitive display in order to cease recording of a new segment, a drag input for moving a recorded segment to a new location in the ordered list, a drag input (e.g., to a trash indication) for deleting one or more recorded segments, a selection of one or more of the recorded segments in the ordered list for detail view (e.g., to apply one or more filters), and/or any other selection or modification associated with the ordered list.

In one or more embodiments of the invention, the UI module (115) includes functionality to perform a modification to the ordered list in response to the input. Examples of the modification may include, but are not limited to, re-ordering the list, moving a segment to a different location in the list, adding a newly recorded segment to the list (e.g., in response to releasing contact with a touch sensitive display), deleting one or more segments from the list, combining one or more segments in the list (e.g., by tiling the segments into a single segment), and/or any other modification to the ordered list.

In one or more embodiments of the invention, the UI module (115) includes functionality to open a detail view corresponding to one or more of the recorded segments. The UI module (115) may be configured to receive a selection of one or more attributes of the recorded segment in the detail view. In one or more embodiments of the invention, in the detail view, the UI module (115) receives a selection of one or more default thumbnail images for a segment. This default thumbnail may be used to represent the segment in a representation of the recorded segment(s) while in capture mode and/or may be used by the UI module (115) to represent the segment in a scroll area including the finalized video vignette, in accordance with various embodiments of the invention. In one or more embodiments of the invention, the application module (105) renders the finalized video vignette in the order depicted by the ordered list.

In one or more embodiments of the invention, the application module (105) includes functionality to create an icon corresponding to a mobile application residing on the client computing device (100). The icon may be a shortcut to launching the mobile application on the client computing device (100). In one or more embodiments of the invention, any type of shortcut for launching the application may be used, depending on the operating system of the client computing device (100). For example, in Apple's iOS operating system, the icon may be implemented as a web clip added to a home screen of an iPhone or iPad. Apple®, iPhone®, and iPad® are registered trademarks of the Apple Corporation (Cupertino, Calif.). IOS® is a registered trademark of the Cisco Corporation (San Jose, Calif.).

In one or more embodiments of the invention, the UI module (115) includes functionality to detect a selection of the icon. The icon may be selected by any number of user inputs, in accordance with various embodiments of the invention.

In one or more embodiments of the invention, the application module (105) includes functionality to launch the mobile application directly into video capture mode in response to detecting the selection. The mobile application may be launched according to one or more parameters associated with the icon. Thus, in the example of a web clip in the iOS operating system, a tag referencing a mobile application may be used. Other parameters may also be included in the web clip. In this example, a tag may specify that the mobile application should be launched into video capture mode, such that a single click enables shooting of a video vignette. In one or more embodiments of the invention, the application module (105) is configured to begin recording of a video segment automatically (i.e., without additional user input) upon launching the application. Conversely, in one or more embodiments, the application module (105) may require additional user input to begin recording.

In one or more embodiments of the invention, the UI module (115) includes functionality to display a stream of content on a display screen of the client computing device (100), wherein the content includes one or more video vignettes. The stream of content may be a chronologically (or otherwise organized) including one or more messages, advertisements, images, videos, audio, uniform resource locators (URLs), offers, web views, surveys, information regarding relevant or associated accounts of the social media platform (150), reviews, endorsements, and/or any other content obtained from the social media platform (150). In one or more embodiments of the invention, the content is pushed to the client computing device (100) in real time by the social media platform (150). In other words, due to the real time nature of the content and interactions in the stream, two users may be logged into different accounts of the social media platform (150) using separate devices, and may be able to interact and conduct a conversation in real time by sending and receiving content (e.g., video vignettes, messages, photos, etc.) during their simultaneous sessions. In one or more embodiments of the invention, the UI module (115) is configured to display the stream of content in a scroll area of a display, and/or may be configured to update the content in response to user input (e.g., pull down to refresh) or some implementation of infinite scrolling.

In one or more embodiments of the invention, the application module (105) includes functionality to identify a set of images, each image representing at least a portion of the video vignette. The UI module (105) may be configured to receive a selection of the images from a user of the client computing device (100) or may assign the images automatically. In one or more embodiments of the invention, each image is a thumbnail image taken from the corresponding portion or location of the video it represents. For example, a first frame, middle frame, last frame, and/or other frame of each of the portions may be used as a thumbnail for that portion. Facial recognition, lighting detection, quality detection, random assignment, and/or any other predefined location of the portion may be used to select the image, in accordance with various embodiments of the invention. In one or more embodiments of the invention, the portion(s) of the video are contiguous video segments of the video vignette which are recorded at different times and/or locations. Conversely, in one or more embodiments, the portions are uniformly sized portions of the video vignette. For example, a 6 second video vignette may include 6 one second portions.

In one or more embodiments of the invention, the application module (105) includes functionality to identify a set of images, each image representing a location of the video vignette. Thus, for example, a thumbnail image may be taken at one or more locations or time intervals of the video vignette.

In one or more embodiments of the invention, the application module (105) includes functionality to associate each image with at least one location in an area of the display screen. The area of the display screen may refer to a scroll area or other graphical element displayed to a user of the client computing device. The location may be a percentage of the vertical and/or horizontal length of the area, or may be a number of vertical and/or horizontal pixels offset within the area. For example, given a 6 second video vignette, the application module may obtain 6 thumbnail images taken from the video in 1 second intervals (beginning at a first frame).

In one or more embodiments of the invention, the application module (105) includes functionality to detect a scroll input associated with the stream. Examples of a scroll input may include, but are not limited to, a multi-touch gesture performed on a touch sensitive display or touchpad, an input from a scroll wheel of a mouse, selection of an arrow or bar in a scrollbar, a selection of an up/down arrow on a keyboard (while the stream is in focus), and/or any other method of scrolling a window, view, page, list, or other UI element.

In one or more embodiments of the invention, the application module (105) includes functionality to scroll, in response to detecting the scroll input, a representation of the video vignette through the area of the display screen. The representation of the video vignette may be modified to display each image at its associated location. In one or more embodiments of the invention, if the images correspond to portions of the video vignette, the application module (105) maps each portion to a section of the scrollable area. As the representation of the video vignette is scrolled through the area, the representation is modified to include a thumbnail from each portion in its corresponding location on the screen. For example, given a six second video vignette with six equal sixed 1 second video segments, the scrollable area is divided into six equal pieces. Beginning at a bottom of the scrollable area, the video is represented by a thumbnail from the first portion as it scrolls through the first ⅙ of the scrollable area, the image changes to a thumbnail from the second portion as the representation scrolls through the second ⅙ of the scrollable area (and so on). Regardless of the scrolling direction, any time the representation enters a different predefined section of the scrollable area, the representation is modified to include the image corresponding to that section.

In one or more embodiments of the invention, the UI module (115) includes functionality to receive a selection of a video vignette within a stream of content displayed on a display screen. The selection may involve a user performing a gesture or other input (e.g., a mouse click) on a representation of the video vignette, or on a UI element associated with the video vignette (e.g., a "play" button).

In one or more embodiments of the invention, the application module (105) includes functionality to initiate playback of the video vignette in response to the selection. The application module (105) may be configured to perform the playback within a representation of the video vignette (e.g., without leaving a scroll area displaying the stream) or elsewhere within a scroll area displaying the stream.

More generally, in one or more embodiments of the invention, the UI module (115) includes functionality to initiate playback and/or stop video playback of a video (e.g., a video vignette) based on one or more predefined user inputs. For example, a user may perform a swipe gesture (e.g., a left/right/up/down gesture) over the representation of the video. In response to detecting the swipe gesture, the application module (105) can be configured to initiate playback of the video. In one or more embodiments, if the video is already playing, the application module (105) can restart playback at a start of the video. In another example, a leftward swipe can initiate/restart playback of the video while a rightward swipe stops playback of the video.

In one or more embodiments of the invention, the UI module (115) includes functionality to allow a user to step through one or more frames/thumbnails of a video in response to detecting a tap and hold gesture on a representation of the video. Thus, a user may tap and hold the representation and then drag in the direction of a playback indicator in order to step forward or backward through frames or thumbnails of the video. For example, one or more predefined images each representing a portion of the video can be displayed as the user steps forward or backward through a segment of the video. In one or more embodiments, the UI module (115) is configured to detect the tap and hold gesture and to enter an "incremental mode" in response to detecting the gesture. Thus, upon releasing the gesture the user can perform a drag gesture to step through one or more frames of the video and/or can perform a multi-touch or other gesture (e.g., a pinch gesture) to zoom in or out of a currently displayed frame. In one or more embodiments, the UI module (115) is configured to exit the "incremental mode" and to return to regular playback mode upon detecting a predefined gesture (e.g., a tap gesture) on the representation of the video. In one or more embodiments of the invention, the audio/video playback, editing, and/or related functionality described herein can be performed within a stream displaying a representation of a video, within a standalone UI including a representation of a video, and/or within any other user interface capable of displaying the representation.

In one or more embodiments of the invention, the UI module (115) includes functionality to detect a scroll input associated with the stream while playing the video vignette. Thus, in one or more embodiments of the invention, the UI module (115) is configured to enable continued interaction with the stream during playback of the video vignette.

In one or more embodiments of the invention, the application module (105) includes functionality to modify a volume of the playback while the video vignette is scrolled through an area of the display screen. The application module (105) may be configured to modify the audio playback based on a location of the video vignette in a scrollable area of the display. For example, the application module (105) may be configured to reduce the volume as the video vignette scrolls out of the viewable area. In this example, the application module (105) maintains the volume level as a linear function of the amount of the video vignette which is visible in the scrollable area. Thus, in this example, as the video vignette scrolls off of the screen, the volume is reduced proportional to its visible presence on the display. In other words, if the video vignette is only 50% viewable on the display screen, the volume level is adjusted to 50%. Any other function for correlating the volume level with the visible amount/percentage of the video vignette may be used, in accordance with various embodiments of the invention. In one or more embodiments of the invention, the application module (105) uses the following formula to adjust the volume: $V_{new}=V_{orig}*(1-P^N)$, where $V_{new}$ is the new volume, $V_{orig}$ is the original volume (i.e., prior to scrolling off of the display), P is a fraction of the video vignette which is no longer visible on the display, and N is an exponent value greater than 1. Any variation of this formula, or any other formula with a positive correlation between visibility of the video vignette and volume level may be used, in accordance with various embodiments of the invention.

In one or more embodiments of the invention, the application module (105) includes functionality to identify an account of a user in a social media platform. The user's account may be identified by accessing an external service (e.g., remote processing module (155)) of the social media platform (150) with one or credentials supplied by the user. The user account can be referred to as a context account and may correspond to an account of the user of the client computing device (100) or a third party account associated with the request.

In one or more embodiments of the invention, the application module (105) includes functionality to identify one or more connected accounts having a graph relationship with the account. The accounts may be identified by searching a connection graph in the connection graph repository (160) for other accounts which are connected, directly and/or indirectly, to the account. In one or more embodiments of the invention, accounts may be connected via uni-directional and/or bi-directional relationships in the graph. In one example, the graph relationship is a follower/followee relationship in which the account of the user follows one or more connected accounts. In this example, the "followed" accounts may not be followers of the "follower" account, and may not be notified that the follower account has decided to follow them. Alternatively, in another example, the account of the user is connected to the connected accounts by a friend relationship in which each party of the friendship has agreed to connect on the social media platform. In one or more embodiments of the invention, the connected accounts have a predefined graph relationship with the user's account. For example, the application module (105) can be configured to select connected accounts within a predefined degree of separation from the context account. Any other criteria can be used to score and/or select connected accounts, in accordance with various embodiments of the invention.

In one or more embodiments of the invention, the application module (105) includes functionality to display, on a display screen of the client computing device (100), a stream of content including a set of videos of the connected accounts. The stream of content displayed in the scroll area may include content specifically associated with the user's account.

In one or more embodiments of the invention, the UI module (115) includes functionality to receive, from the user, a selection of a UI element associated with at least one of the videos (e.g., a video vignette) displayed in the stream. For example, the UI module (115) may receive a selection of a "respond" button, link, or any icon or graphical element configured to enable linking or associating one or more other videos with the video(s) associated with the UI element.

In one or more embodiments of the invention, the application module (105) includes functionality to identify one or more selected videos, and to attach the selected videos to the video(s) associated with the UI element. For example, the UI module (115) may provide a UI for selecting videos from the user's own account in order to attach or otherwise respond to the video(s) associated with the UI element. The application module (105) may be configured to combine the selected videos and the video(s) associated with the UI element into one video vignette. For example, one or more segments of the videos may be selected for inclusion in the combined video based on a random selection, a location between the shooting of the segments, a length of time between the shooting of the segments, and/or any other criteria for compiling multiple video segments from multiple videos into a single video. In one or more embodiments of the invention, the UI module (115) is configured to receive the selection of individual segments from the user's video(s) for inclusion in the combined video or in reply to the video(s) associated with the UI element.

In one or more embodiments of the invention, the rendering module (110) includes functionality to generate a single looping video vignette including at least a portion of the selected video and the video(s) associated with the UI element.

In one or more embodiments of the invention, the rendering module (110) includes functionality to display combined looping video vignette within one or more streams of various accounts having a graph relationship with accounts that contributed to the combined video vignette (e.g., followers of those accounts).

In one or more embodiments of the invention, the remote processing module (155) includes functionality to receive a first video taken at a first location from a first mobile device. The remote processing module (155) may be configured to identify geo-tagging or other location information of the first video. For example, the remote processing module (155) may be configured to identify global positioning system (GPS) coordinates identifying the first location as the place where the first video was recorded.

In one or more embodiments of the invention, the remote processing module (155) includes functionality to identify one or more promoted video vignettes that are related to a context account (e.g., an account of a user associated with a request for promoted content). Promoted video vignettes can include videos selected for advertising to other users, videos preselected by an administrator (e.g., a "top picks" video), and/or any other video, in accordance with various embodiments. For example, the remote processing module (155) can be configured to identify promoted video vignettes based on a graph relationship between the context account and an advertising account of an advertiser promoting the video. In another example, the remote processing module (155) is configured to identify promoted video vignettes by matching one or more attributes of the context account with attributes of the particular promoted video and/or attributes (e.g., keywords) preselected by an advertiser of the promoted video. In one or more embodiments of the invention, the remote processing module (155) includes functionality to track engagement with one or more promoted video vignettes and to provide engagement data for use in calculating advertising costs associated with the promoted video.

In one or more embodiments of the invention, the remote processing module (155) includes functionality to insert one or more promoted videos within a stream of a context account based on a predefined formula for matching promoted content to an account and/or locations within a stream of an account.

In one or more embodiments of the invention, the remote processing module (155) includes functionality to select a "popular" stream of video vignettes based on user engagement with the video vignettes. For example, the remote processing module (155) can be configured to identify one or more videos with a high number of "favorites" (e.g., or other engagement metric(s)) and to display the videos in a stream associated with a context account. In one or more embodiments, videos can be selected for inclusion in the popular stream based on one or more graph relationships between the context account and the high-engagement videos. The UI module (115) can be configured to display a representation of a video vignette within a stream in conjunction with (1) a name of the authoring account of the video vignette, (2) an indication of whether the context account and the authoring account of the video share a graph relationship (e.g., "follow"/"following"), (3) biographical data of the authoring account, and/or (4) a location associated with the authoring account.

In one or more embodiments of the invention, the remote processing module (155) includes functionality to select popular authoring accounts for inclusion in a popular stream of an account. For example, the remote processing module (155) can be configured to identify one or more accounts with a high number of graph connections (e.g., exceeding a predefined number of graph connections) and/or high average engagement (e.g., exceeding a predefined engagement amount) of one or more posted videos and to display an indication of the accounts in a stream of a context account. In one or more embodiments, videos can be selected for inclusion in the popular accounts stream based on one or more graph relationships between the context account and the popular accounts. The UI module (115) can be configured to display a representation of an account within a stream in conjunction with (1) a name of the account, (2) an indication of whether the context account and the account share a graph relationship (e.g., "follow"/"following"), (3) biographical data of the account, and/or (4) location of the account.

In one or more embodiments of the invention, the remote processing module (155) includes functionality to receive a second video taken at a second location from a second mobile device. The remote processing module (155) may be configured to identify geo-tagging or other location information of the second video. For example, the remote processing module (155) may be configured to identify global positioning system (GPS) coordinates identifying the second location as the place where the second video was recorded. The remote processing module (155) may be configured to infer/estimate the first location and/or the second location based on general location information obtained from the corresponding mobile device(s) (e.g., GPS coordinates logged at a time in which the video(s) were recorded, etc.).

In one or more embodiments of the invention, the remote processing module (155) includes functionality to detect whether the first location is within a predefined proximity of the second location. The remote processing module (155) may be configured to calculate a distance between the first location and the second location and to compare the distance with the predefined proximity value (e.g., 20 meters). Based on the comparison, the remote processing module (155) may then determine whether the first video was recorded within the predefined proximity of the second video.

In one or more embodiments of the invention, the remote processing module (155) includes functionality to determine whether the first video was filmed within a predefined time window of the second video. The remote processing module (155) may be configured to compare timestamps, logs, metadata, and/or other information to identify a recording time of the videos. The remote processing module (155) may then compare the recorded times and calculate a delta (i.e., a difference) between them. The remote processing module (155) may then compare the delta to a predefined time threshold. If the delta is within the predefined time threshold, the remote processing module (155) may tag the first video and the second video as being recorded within the same relative time.

In one or more embodiments of the invention, the remote processing module (155) includes functionality to construct a combined video vignette including the first video and the second video. The remote processing module (155) may construct the combined video vignette based on determining that the first video and the second video were recorded within the same relative time window and/or based on determining that the first video was recorded within a predefined proximity of the second video.

In one or more embodiments of the invention, the remote processing module (155) includes functionality to send the combined video vignette to one or more client computing devices of users of the social media platform (150). The remote processing module (155) may be configured to tag the combined video vignette for inclusion in content streams of accounts having a predefined graph relationship (e.g., subscription to, friendship with, following, etc.) with the first account, the second account, and/or both accounts.

In one or more embodiments of the invention, the application module (105) is a component of a software application or a set of related software applications configured to execute on one or more hardware processors of the client computing device (100). The application module (105) may include one or more reader and/or writer threads configured to perform multiple concurrent iterations of one or more of the disclosed methods. In one or more embodiments of the invention, some or all of the application module (105) is integrated within or operatively connected to an operating system of the client computing device (100).

In one or more embodiments of the invention, the rendering module (110) is a component of a software application or a set of related software applications configured to execute on one or more hardware processors of the client computing device (100). The rendering module (110) may include one or more reader and/or writer threads configured to perform multiple concurrent iterations of one or more of the disclosed methods. In one or more embodiments of the invention, some or all of the rendering module (110) is integrated within or operatively connected to an operating system of the client computing device (100). In one or more embodiments of the invention, some or all of the rendering/finalization functionality discussed herein (e.g., rendering a video vignette, applying filters to a video vignette, etc.) may be performed by a remote server application (e.g., remote processing module (155)) instead of the rendering module (110).

In one or more embodiments of the invention, the UI module (115) is a component of a software application or a set of related software applications configured to execute on one or more hardware processors of the client computing device (100). The UI module (115) may include one or more reader and/or writer threads configured to perform multiple concurrent iterations of one or more of the disclosed methods. In one or more embodiments of the invention, some or all of the UI module (115) is partially or entirely integrated within or operatively connected to an operating system of the client computing device (100).

Figure 14:
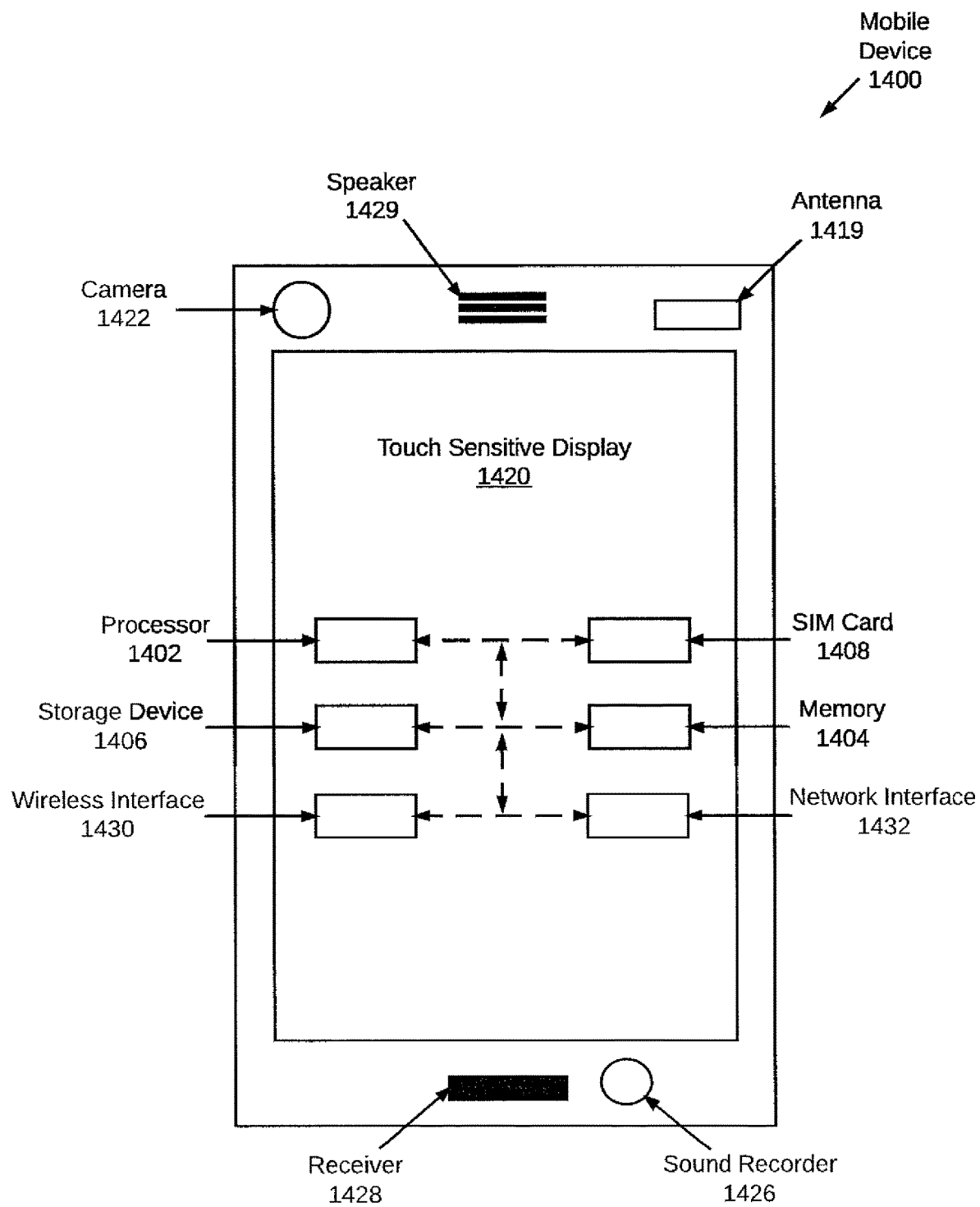
FIG. 14 shows a mobile device in accordance with one or more embodiments of the invention.
Figure 15:
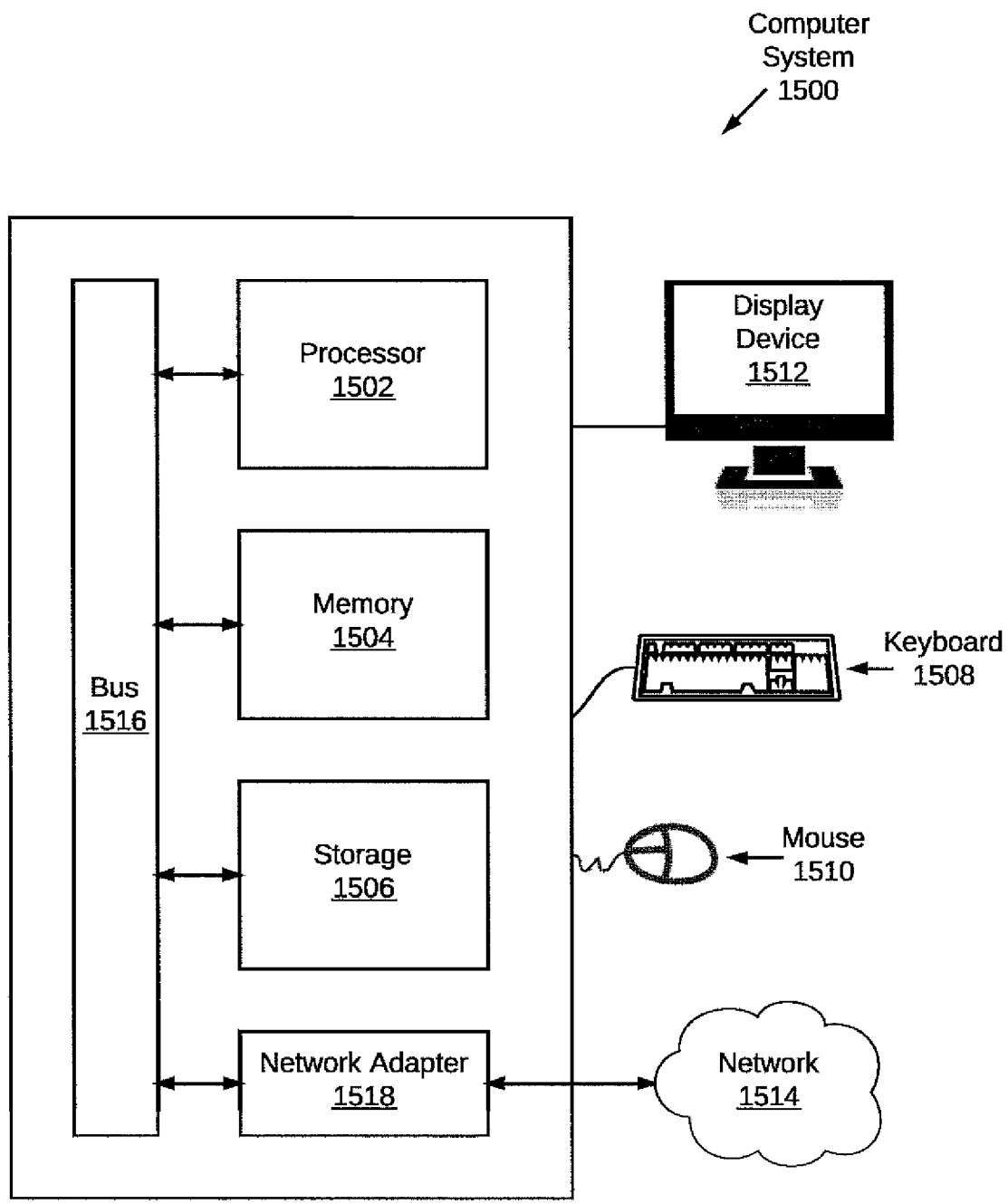
FIG. 15 shows a computer system in accordance with one or more embodiments of the invention.

In one or more embodiments of the invention, the client computing device (100) is a hardware computing device including one or more processors capable of executing software. Examples of a computing device may include, but are not limited to, a smartphone, a tablet computer, a netbook, a laptop computer, a desktop computer, an automotive computer system, a gaming console, and/or any other standalone or embedded system including a user interface. The application module (105), rendering module (110), and/or UI module (115) may be part of a software application executing on the computing device, or may be partially or entirely integrated within an operating system of the computing device, in accordance with various embodiments of the invention. FIGS. 14 and 15 (described below) depict examples of such a device.

In one or more embodiments of the invention, the social media platform (150) is a platform for facilitating the exchange of real-time data (e.g., text, audio, video, images, etc.) between one or more entities. For example, the social media platform (150) may store millions of accounts of individuals, businesses, and/or other entities (e.g., pseudonym accounts, novelty accounts, etc.). One or more users of each account may use the social media platform (150) to send content to other accounts inside and/or outside of the social media platform (150). The social media platform (150) may be configured to enable users to communicate in "real-time", i.e., to converse with other users with a minimal delay and to conduct a conversation with one or more other users during simultaneous sessions. In other words, the social media platform (150) may allow a user to broadcast content and may display the content to one or more other users within a reasonable time frame so as to facilitate a live conversation between the users. Recipients of a message may have a predefined graph relationship with an account of the user broadcasting the message. In one or more embodiments of the invention, the user is not an account holder or is not logged in to an account of the social media platform (150). In this case, the social media platform (150) may be configured to allow the user to broadcast messages and/or to utilize other functionality of the social media platform (150) by associating the user with a temporary account or identifier.

In one or more embodiments of the invention, the remote processing module (155) is a component of a software application or a set of related software applications configured to execute on one or more hardware processors of one or more server computing devices. The remote processing module (155) may include one or more reader and/or writer threads configured to communicate with multiple clients (e.g., client computing device (100)) and to perform multiple concurrent iterations of one or more of the disclosed methods. In one or more embodiments of the invention, the remote processing module (155) is implemented as a component of a distributed system with multiple nodes connected by a network. Accordingly, the functionality of the remote processing module (155) may be distributed across multiple networked physical devices.

In one or more embodiments of the invention, the connection graph repository (160) stores a connection graph including a number of nodes connected by edges. The connection graph may be implemented as a data structure (e.g., a tree structure) representing each account of the social media platform (150) as a node, and representing relationships between the accounts (e.g., friendship, follower/followee, fans, etc.) as edges.

In one or more embodiments of the invention, the video repository (165) stores user generated content and related data of the social media platform (150) (e.g., video vignettes, content metadata, geolocation data, reply structures, images, messages, streams, and/or, etc.).

In one or more embodiments of the invention, one or more of the data repositories (connection graph repository (160) and video repository (165)) is a database and/or storage service residing on one or more servers. For example, one or more of the data repositories may be implemented as a storage service using service-oriented architecture (SOA) and configured to receive requests for data and to provide requested data to other components of the social media platform (150). In another example, the data repositories may include one or more tables in a distributed database management system (DBMS), a clustered database, a standalone flat file, an unstructured database, and/or any storage software residing on one or more physical storage devices. Examples of a storage device may include, but are not limited to, a hard disk drive, a solid state drive, and/or other memory device. Any type of database or storage application can be used, m accordance with various embodiments of the invention.

In one or more embodiments of the invention, one or more of the data repositories (connection graph repository (160) and video repository (165)) is a separate application or series of applications residing on one or more servers external (and communicatively coupled) to the social media platform (150). Alternatively, in one or more embodiments of the invention, one or more of the data repositories may be an integrated component of the social media platform (150) and/or may reside, either partially or entirely, on one or more common hardware devices (e.g., a server).

Figure 2:
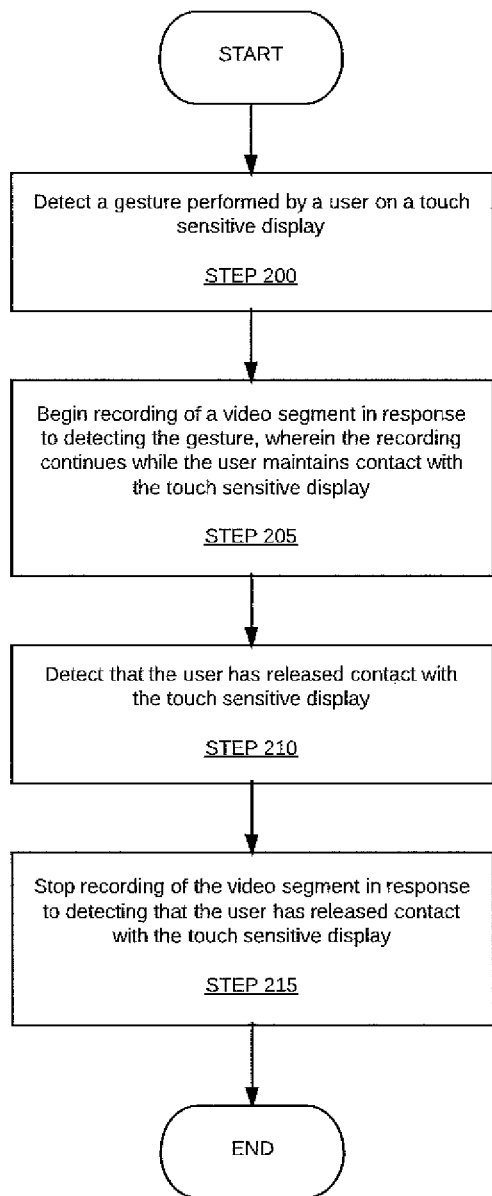
FIGS. 2-9 show flowcharts in accordance with one or more embodiments of the invention.

FIG. 2 shows a flowchart of a method for recording a video. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 2 should not be construed as limiting the scope of the invention.

In STEP 200, a gesture is performed by a user on a touch sensitive display. The gesture may be detected by a UI module (e.g., UI module (115) of FIG. 1, discussed above) of a computing device. In STEP 205, a recording of a video segment is initiated in response to detecting the gesture. In one or more embodiments of the invention, the recording continues while the user maintains contact with the touch sensitive display.

In STEP 210, it is detected that the user has released contact with the touch sensitive display. In STEP 215, recording of the video segment is ceased in response to detecting that the user has released contact. In one or more embodiments of the invention, the video segment is automatically, rendered, finalized, and/or uploaded to a remote server in response to detecting that the user has released contact. Conversely, in one or more embodiments, the video segment is a component of a video vignette including multiple segments.

Figure 3:
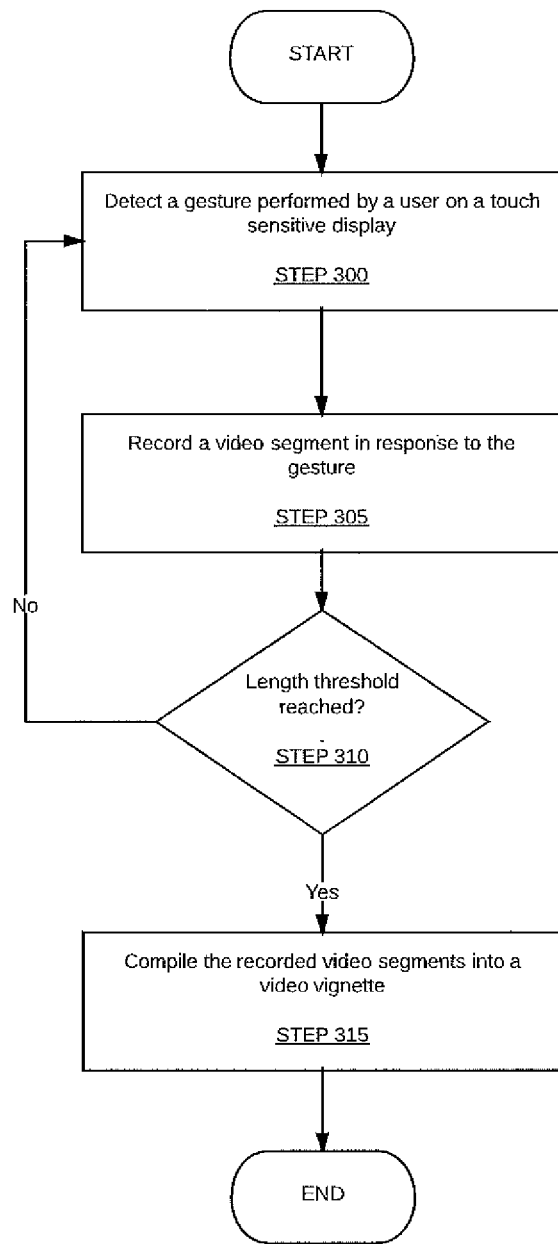

FIG. 3 shows a flowchart of a method for recording a video vignette. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 3 should not be construed as limiting the scope of the invention.

In STEP 300, a gesture performed by a user on a touch sensitive display is detected. Any gesture or input may be used, in accordance with various embodiments of the invention. In STEP 305, a video segment is recorded in response to the gesture.

In STEP 310, it is determined whether the pending video vignette has reached a predefined length threshold. If it is determined that the length threshold is reached, the process proceeds to STEP 315. If it is determined that a current length of the pending video vignette is less than the length threshold, the process proceeds to STEP 300. In one or more embodiments of the invention, a user may choose to complete the video vignette prior to reaching the length threshold.

In STEP 315, the recorded video segments are compiled into a video vignette. Compiling, rendering, finalizing, and/or uploading of the recorded video segments may occur concurrently with the recording of one or more of the video segments, in between the recording of individual segments, and/or at any point prior to reaching STEP 315. A mobile device may enable saving of a pending video vignette such that recorded segments are saved on the mobile device and retrieved at a later time (e.g., during a subsequent session with the mobile application) for further recording, editing, and/or finalization of the video vignette.

Figure 4:
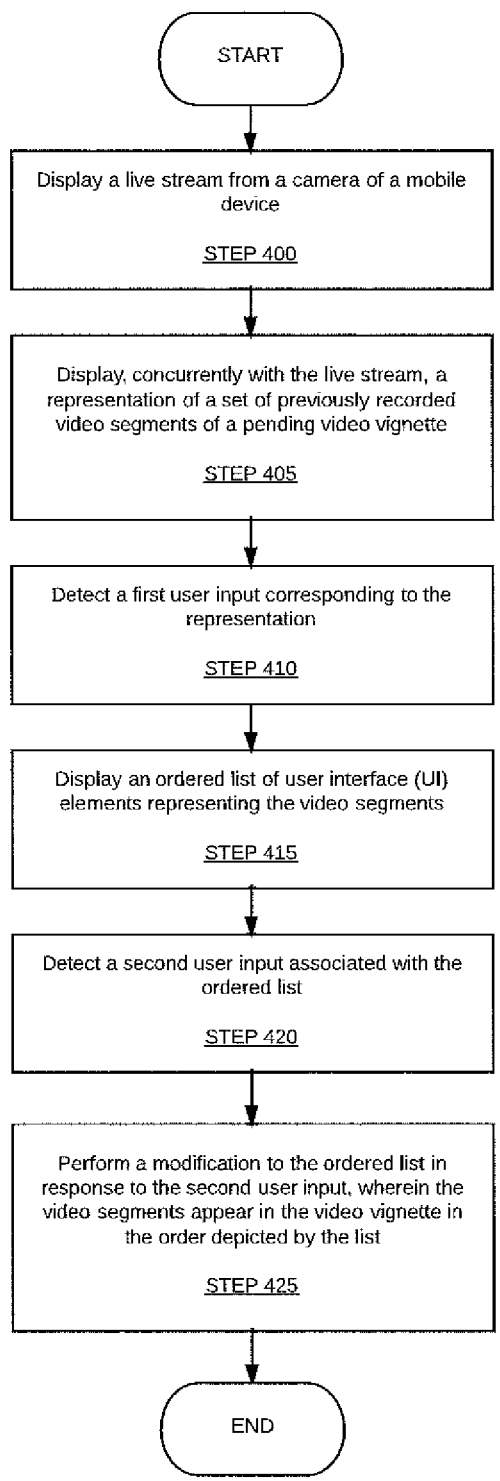

FIG. 4 shows a flowchart of a method for displaying a user interface associated with a video vignette. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 4 should not be construed as limiting the scope of the invention.

In STEP 400, a live stream from a camera of a mobile device is displayed. For example, the live stream may be displayed while in a video capture mode of a mobile application. In STEP 405, a representation of a set of previously recorded video segments is displayed concurrently with the live stream. The representation may be any graphical element representing one or more video segments (e.g., thumbnail(s), icon(s), tab(s), etc.).

In STEP 410, a first user input corresponding to the representation is detected. Examples of the user input may include, but are not limited to, a selection of a hyperlink, a click or gesture on the representation, a double tap on the representation, and/or any other input indicating a desire to select, expand, and/or provide additional detail on the video segment(s).

In STEP 415, an ordered list of UI elements representing the video segments is displayed. The list may be displayed graphically as a series of tabs, icons, thumbnails, pages, panels, numbers, and/or any other ordered set of elements, in accordance with various embodiments of the invention.

In STEP 420, a second user input associated with the ordered list is detected. The second input may be directed towards a specific subset of the ordered list (e.g., a single video segment). For example, a user may select an icon representing one of the video segments in order to apply one or more filters to the segments. In another example, the user may drag one or more of the video segments in order to re-order (e.g., to a new location) or remove them from the ordered list (e.g., by dragging to a trash icon).

In STEP 425, a modification to the ordered list is performed in response to the second user input. The modification may involve displaying a new thumbnail selected by a user to represent a modified segment, displaying the modified list to show a modified order of segments, removing one or more segments from the list, and/or performing any other edit(s) requested by the user. In one or more embodiments of the invention, the video segments appear in the posted video vignette in the order depicted by the final list.

Figure 5:
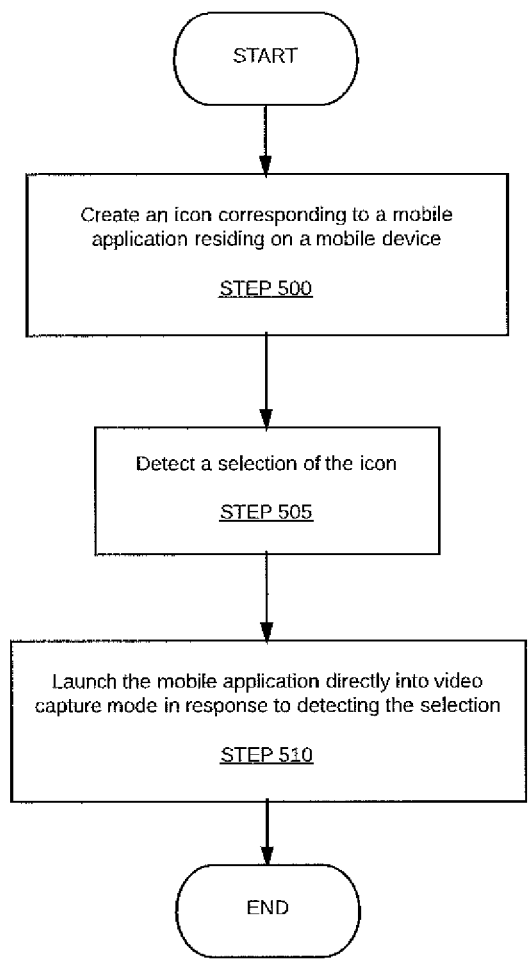

FIG. 5 shows a flowchart of a method for launching a mobile application. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 5 should not be construed as limiting the scope of the invention. Furthermore, it should be noted that the user of a mobile application is only for exemplary purposes, and that the steps of the described method may be used with any application, including non-mobile applications, in accordance with various embodiments of the invention.

In STEP 500, an icon corresponding to a mobile application residing on a mobile device is created. The icon may be any graphical element which, when selected, causes the mobile application to be launched. The icon may be associated with one or more parameters for launching and/or execution of the mobile application. For example, a parameter may request a particular page or mode of the application to be displayed upon launching.

In STEP 505, a selection of the icon is detected. Any user input may be user, in accordance with various embodiments of the invention. In STEP 510, the mobile application is launched directly into video capture mode in response to detecting the selection of the icon. Video capture mode may be any mode in which a live video stream is presented to the user, a record option is displayed to the user, and/or recording of a video is initiated.

Figure 6:
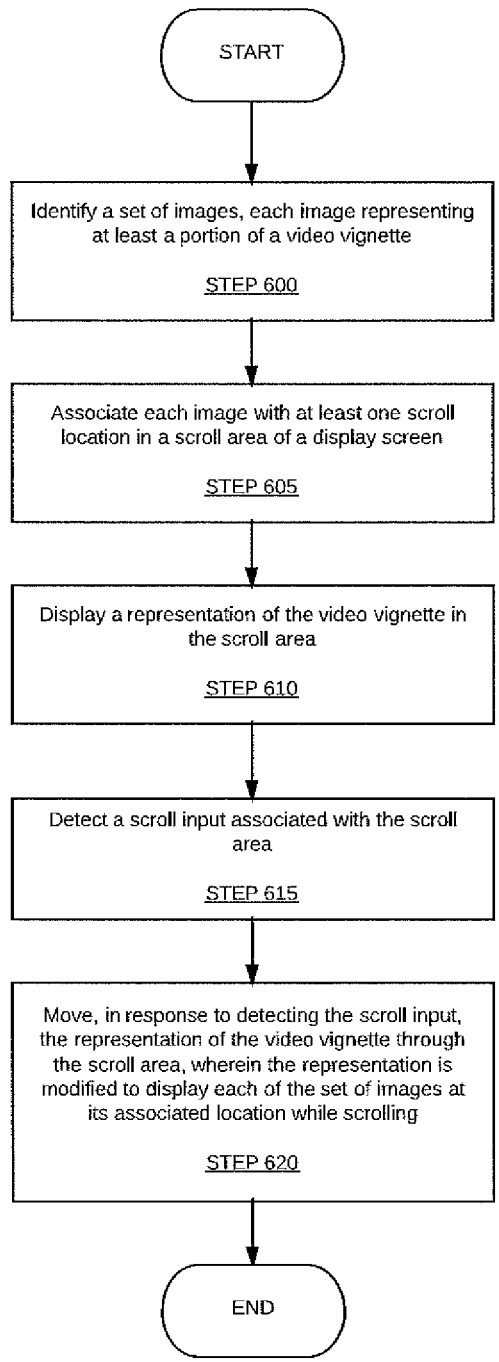

FIG. 6 shows a flowchart of a method for scrolling a video through a scroll area. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 6 should not be construed as limiting the scope of the invention.

In STEP 600, a set of images is identified, each image representing at least a portion of a video vignette. The images may correspond to individual video segments of a video vignette, and/or may correspond to separate pre-defined sections of a video.

In STEP 605, each image is associated with at least one scroll location in a scroll area of a display screen. The scroll area may display a stream of content including representations of one or more video vignettes. A subset of the scroll area may first be identified. For example, given a representation of a video vignette which is 50 pixels in height and a scrollable area which is 800 pixels in height, the top and bottom 50 pixels may be excluded and the middle 700 pixels may be considered. In this example, the middle 700 pixels are then divided into N equal-sized sections, where N is the number of images. Given that 7 images are present, the 700 pixel height of the scroll area is then divided into 100 pixel segments.

In STEP 610, a representation of the video vignette is displayed in the scroll area. The representation may include a first of the set of images (e.g., a thumbnail image) as it enters a viewable area of the display screen at an initial location. Given that the images represent the sequence of a video vignette, the first image may represent a first portion of the video.

In STEP 615, a scroll input associated with the scroll area is detected. Any type of scroll input may be used, in accordance with various embodiments of the invention. In STEP 620, the representation of the video vignette is moved through the scroll area in response to detecting the scroll input, wherein the representation is modified to display each of the set of images at its associated location while scrolling. Thus, for example, the representation may be modified to a different thumbnail image as it is scrolled upwards in the scroll area. A reverse in the scroll direction may change the representation to a previously displayed thumbnail (e.g., if the representation enters a lower section associated with the previously displayed thumbnail). In this way, in one or more embodiments of the invention, the position of the representation in the scroll area dictates the appearance of the representation.

Figure 7:
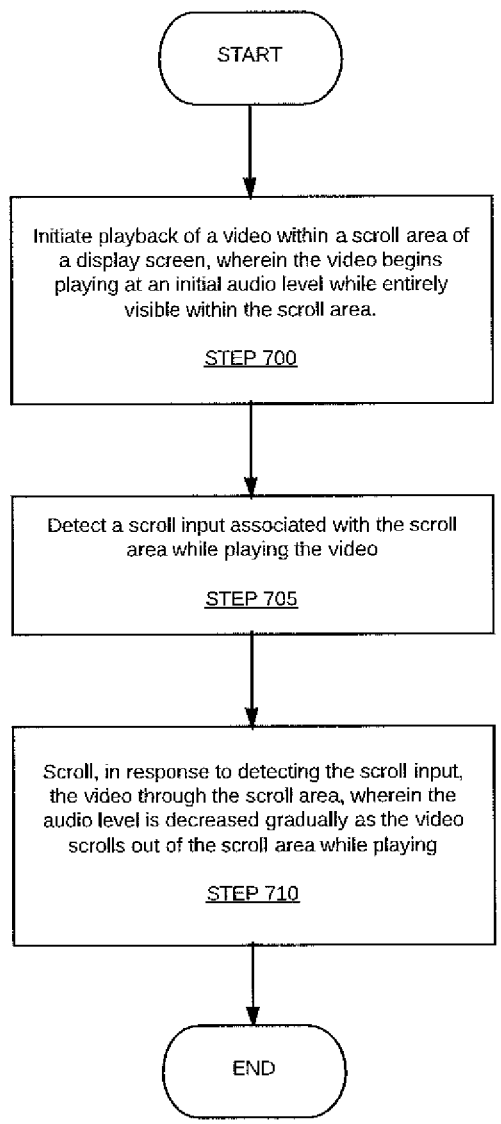

FIG. 7 shows a flowchart of a method for scrolling a video through a scroll area. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 7 should not be construed as limiting the scope of the invention.

In STEP 700, playback of a video (e.g., a video vignette) is initiated within a scroll area of a display screen, wherein the video begins playing at an initial audio level while entirely visible within the scroll area. The playback may be initiated in response to a user's selection of a representation of the video (e.g., a thumbnail image).

In STEP 705, a scroll input associated with the scroll area is detected while playing the video. In STEP 710, the video is scrolled through the scroll area in response to detecting the scroll input, wherein the audio level of the video is decreased gradually as the video scrolls out of the scroll area while playing. In other words, the audio level may be adjusted depending on a location of the video in the scroll area. Furthermore, the audio level may be decreased from an initial level as visibility of the video is decreased due to the scrolling. Any relationship between the percentage or amount of visibility of the video and the audio level may be used, in accordance with various embodiments of the invention. If playback of the video is initiated while a representation of the video is partially not visible in the scroll area, the initial level may be maintained (i.e., not increased) as the video re-enters a visible area of the display.

Figure 8:
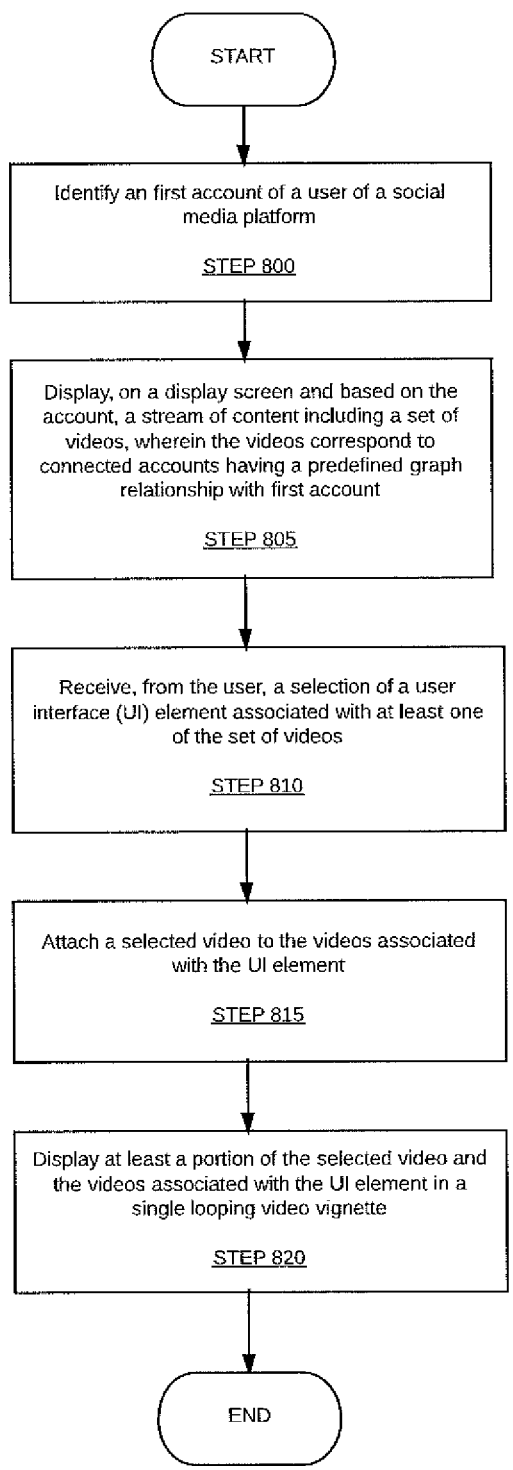

FIG. 8 shows a flowchart of a method for associating one or more videos in response to user input. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 8 should not be construed as limiting the scope of the invention.

In STEP 800, a first account of a user of a social media platform is identified. In STEP 805, based on the first account, a stream of content including a set of videos is displayed on a display screen. In one or more embodiments of the invention, the set of videos correspond to one or more connected accounts which are connected to the first account in a connection graph of the social media platform. The content may also include one or more images, videos, messages, advertisements, offers, recommendations, reviews, promoted messages, promoted accounts, promoted videos, and/or other content relevant to the social media platform.

In STEP 810, a selection of a UI element associated with at least one of the videos is received. The UI element may be a hyperlink, icon, button, or other element designed for replying to the video(s). Thus, for example, a user may select a hyperlink labeled "reply to this video" under a video shown in the stream.

In STEP 815, a selected video is attached to the video(s) associated with the UI element. In one or more embodiments of the invention, the user is presented with a user interface for capturing a new video or selecting an existing video. Then, the one or more selected videos are attached to the video(s) associated with the UI element. Attaching the videos may include maintaining a reference between the videos, tagging the videos, and/or using one or more portions of the videos to generate a combined video. The attaching of the videos may be performed by the mobile device (e.g., by rendering module (110) of FIG. 1, discussed above), or by a remote server (e.g., by remote processing module (155) of FIG. 1, discussed above).

In STEP 820, at least a portion of the selected video and the video(s) associated with the UI element are displayed in a single looping video vignette. For example, after combining the videos into a single video vignette, the combined video vignette may be streamed and/or downloaded to one or more mobile devices. Various different accounts of a social media platform may be selected for viewing the combined video vignette based on their relationships (e.g., based on a predefined degree of separation in a connection graph) with the source accounts of the videos including in the single looping video vignette.

Figure 9:
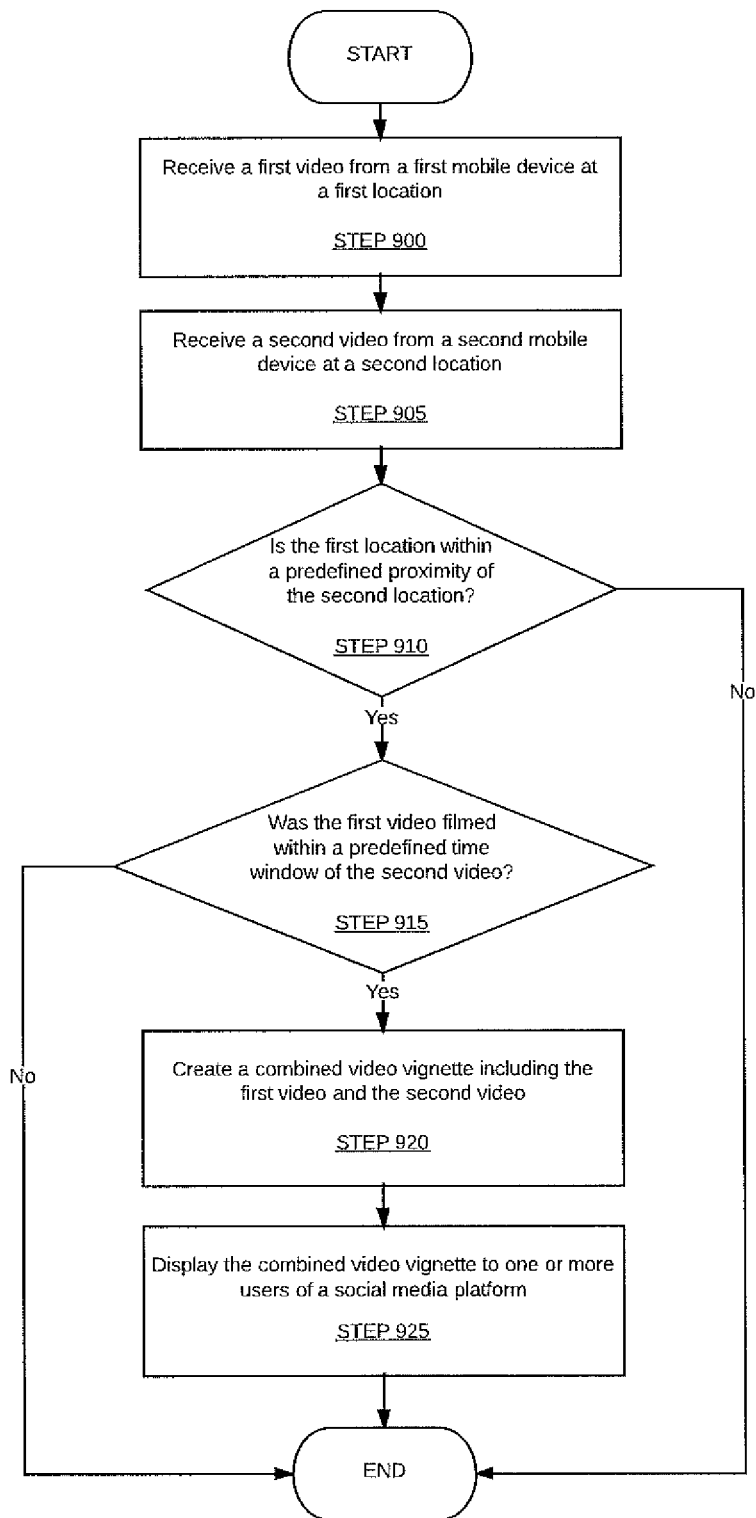

FIG. 9 shows a flowchart of a method for creating a combined video vignette. While the various steps in this flowchart are presented and described sequentially, one of ordinary skill will appreciate that some or all of the steps may be executed in different orders and some or all of the steps may be executed in parallel. Further, in one or more embodiments of the invention, one or more of the steps described below may be omitted, repeated, and/or performed in a different order. Accordingly, the specific arrangement of steps shown in FIG. 9 should not be construed as limiting the scope of the invention.

In STEP 900, a first video (e.g., a video vignette, or a segment of a video vignette) is received from a first mobile device at a first location. In STEP 905, a second video (e.g., a video vignette or a segment of a video vignette) is received from a second mobile device at a second location. The first video and the second video may be received at different times and/or from different locations.

In STEP 910, it is determined whether the first location is within a predefined proximity of the second location. If it is determined that the first location is within the predefined proximity of the second location, the process proceeds to STEP 915. If it is determined that the first location is not within the predefined proximity of the second location, the process ends. The predefined proximity may be adjusted based on the accuracy of the location data, in accordance with various embodiments of the invention. Furthermore, object recognition may be used to estimate a location of one or more videos. For example, if a video is obtained from a location in Paris (as determined based on an internet protocol (IP) address or a cellular telephone number), the video may be scanned for recognition of common landmarks such as the Eiffel Tower. In this example, if a match is made, the location of the video is estimated as an address of the Eiffel Tower.

In STEP 915, it is determined whether the first video was recorded within a predefined time window of the second video. If it is determined that the first video was recorded within the predefined time window, the process proceeds to STEP 920. If it is determined that the first video was not recorded within the predefined time window, the process ends. STEPS 910 and 915 may be performed concurrently and/or in any order, in accordance with various embodiments of the invention. In one or more embodiments, the location(s) and/or time(s) of the first video and/or second video(s) may be obtained prior to, during, and/or after receiving the video(s) from their respective mobile devices.

In STEP 920, a combined video vignette including the first video and the second video is created. In STEP 925, the combined video vignette is displayed to one or more users of a social media platform. Location based data, graph data (e.g., from connection graph repository (160) of FIG. 1, discussed above), preference data, and/or other relevant data may be used to determine which users should receive the combined video vignette. For example, the combined video vignette may be included in the content streams of one or more users within a predefined proximity of the location. In another example, the combined video vignette may be included in the content streams of one or more other users who were present within a predefined proximity of the location at some point in time (e.g., at the recording time of the video(s)), regardless of whether they captured any video at the time. In this example, location information captured from a mobile device of each user may be used to determine their location.

The following section describes various examples of the invention. The examples are included to aid in the understanding of the invention but are not intended to limit the scope of the invention.

Figure 10:
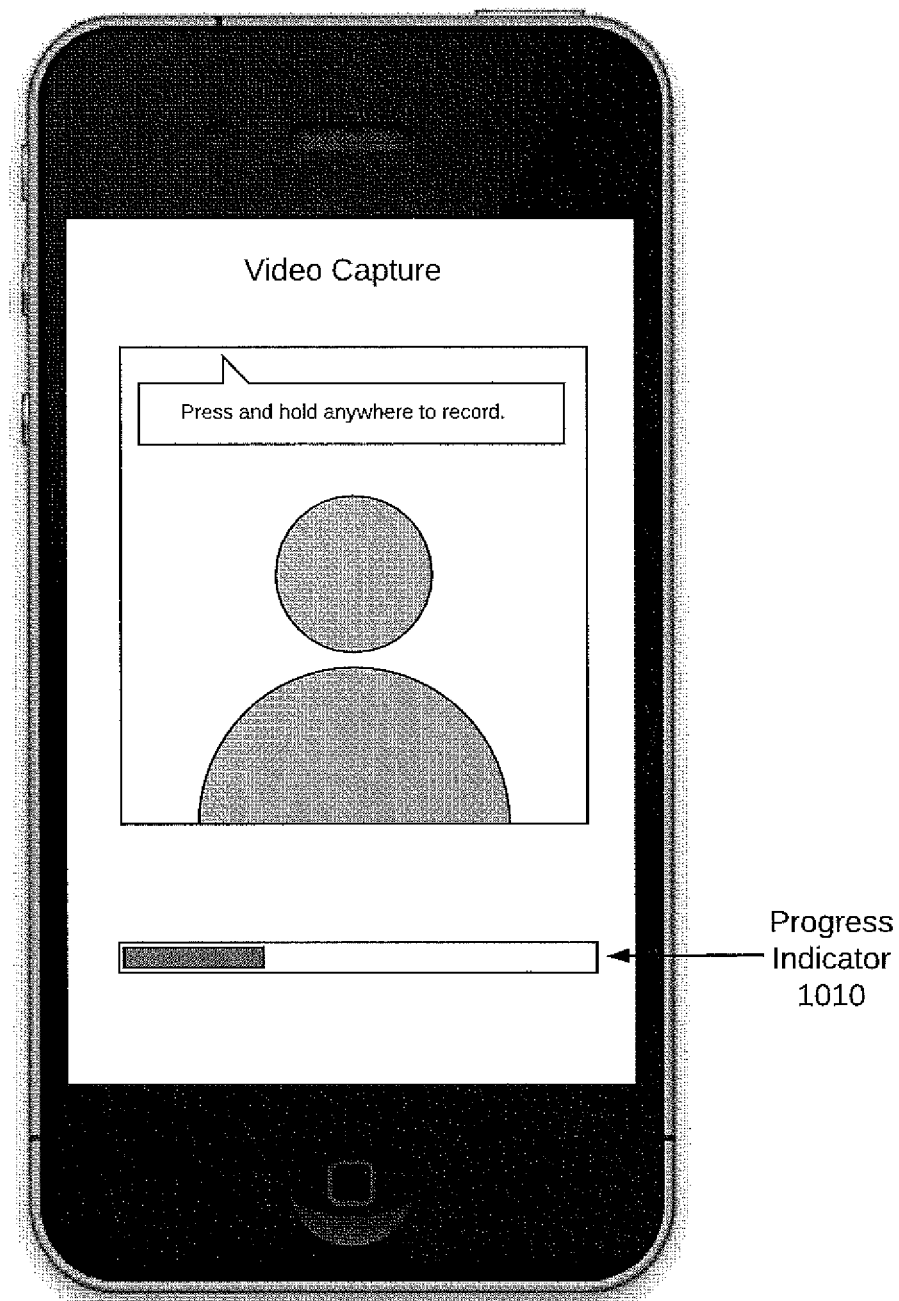
FIGS. 10-13 show example screenshots of mobile devices in accordance with one or more embodiments of the invention.

FIG. 10 depicts an example of a screenshot of a mobile device (1000). In the example of FIG. 10, a mobile application enters video capture mode and displays a live stream of video from a camera of the mobile device (1000). The user initiates recording of a video vignette by pressing and holding anywhere on the touch sensitive display. When the user releases contact with the display, recording is stopped. When the user presses and holds contact with the display, recording of a new video segment begins. The total elapsed time of the video vignette is represented by a progress indicator (1010) at a bottom of the display screen.

Figure 11:
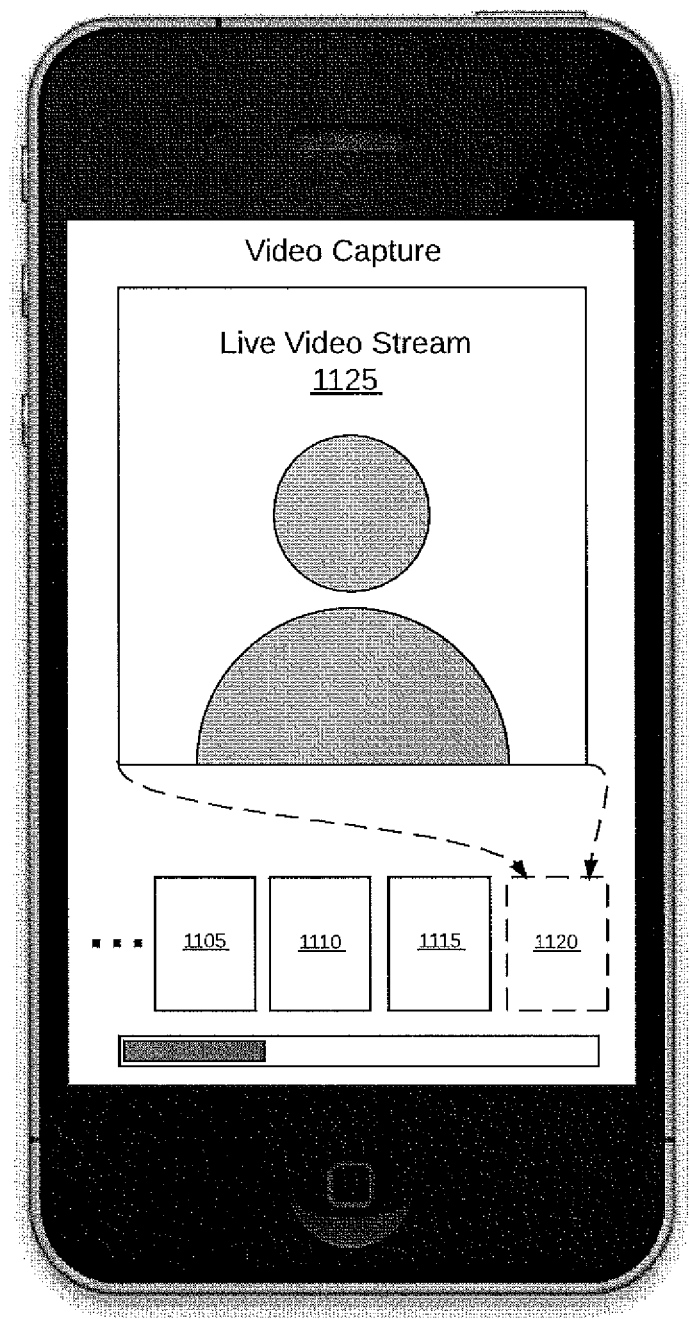

FIG. 11 depicts an example of a screenshot of a mobile device (1100). In the example of FIG. 11, a user of a mobile application records a set of segments of a video vignette and saves the pending video vignette as a draft. The user then relaunches the mobile application and enters a video capture mode in order to resume recording of the video vignette. A set of previously recorded segments of the video vignette are represented by an ordered list of thumbnail images (1105, 1110, 1115). The user then records a new segment. Upon ending the recording of the new segment, the mobile application displays an animation showing a representation of the video vignette (e.g., a first or last frame) sliding from the area of the live video stream (1125) into a new element (1120) at a head of the ordered list. FIG. 11 depicts the animation and the creation of the new thumbnail image (1120).

Figure 12:
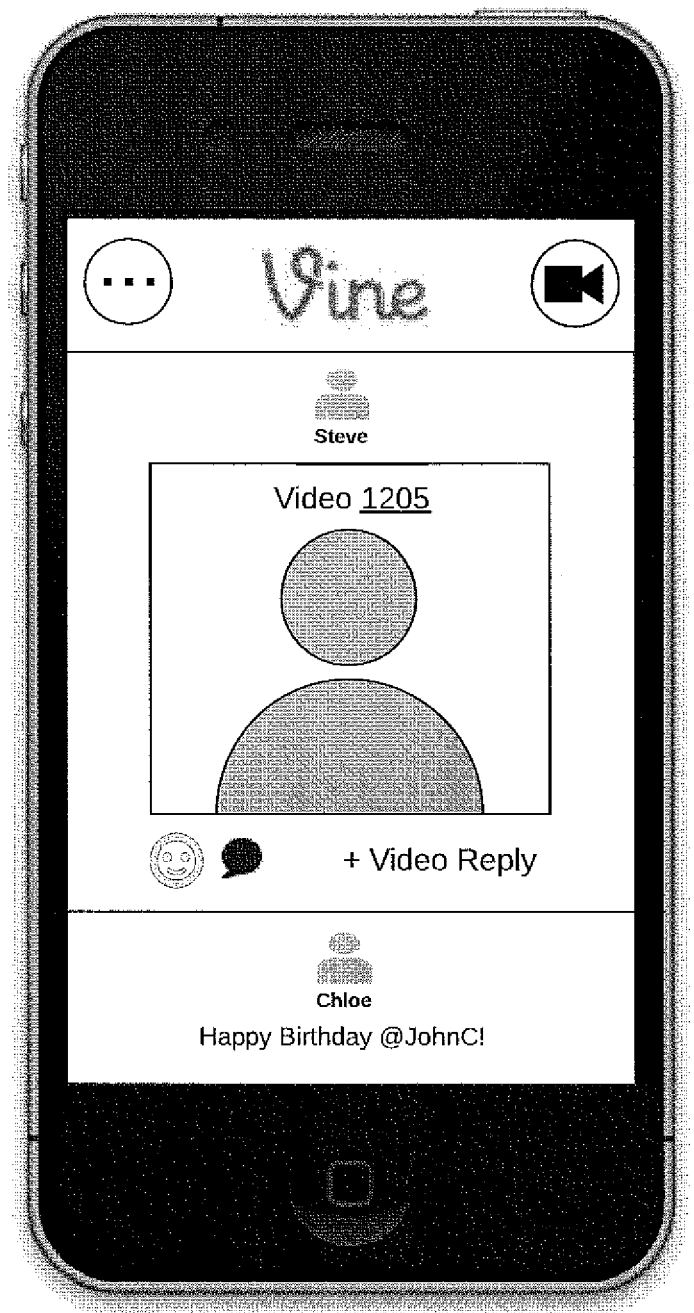

FIG. 12 depicts an example of a screenshot of a mobile device (1200). In the example of FIG. 12, a user launches a mobile application and a stream of content associated with an account of the user in a social media platform is displayed to the user. In this example, the user "follows" a set of other accounts in the social media platform, and the content displayed in the user's stream includes user-generated content pushed from those accounts to the mobile device in real time. In this example, a video (1205) is presented in the user's stream, along with a hyperlink at a bottom of the video labeled "Video Reply". The user selects the hyperlink and a window is displayed showing one or more videos stored locally in a storage of the mobile device (1200). The user selects a video and the video is uploaded to a server of the social media platform. A remote processing module (e.g., remote processing module (155) of FIG. 1, discussed above) then renders a combined video (a looping video vignette), and includes the new looping video vignette in the user's stream, the stream of the account of the original video, as well as the streams of one or more other accounts having a predefined graph relationship with the two accounts. This process of replying to the video is then repeated to create additional combined looping video vignettes with additional replies posted by other users of the social media platform. In this way, longer and longer looping video vignettes are created and shared with a growing network of accounts of the social media platform. The combined video vignette(s) is also shared with one or more additional users based on location information of one or more segments of the video vignette, and/or location information of users in proximity of the recording of the segment(s).

Figure 13:
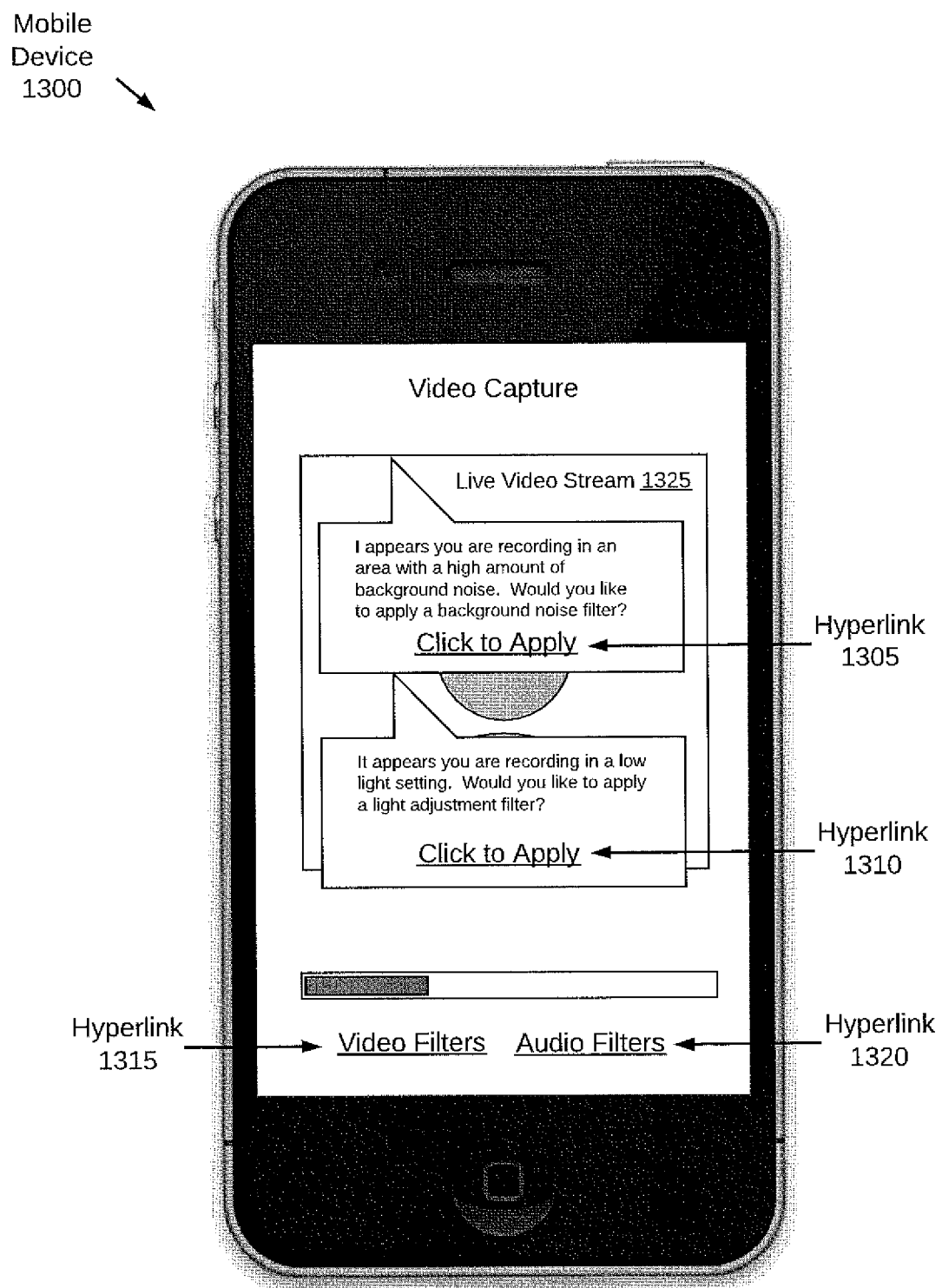

FIG. 13 depicts an example of a screenshot of a mobile device (1300). In the example of FIG. 13, a user enters a video capture mode of a mobile application and begins recording a new video by pressing and holding on a touch sensitive display of the mobile device showing a live video stream (1325). In this example, the user is viewing a concert in an extremely noisy and low-light setting. As the video records, an application module of the mobile application detects that the sound in the concert hall exceeds a predefined sound threshold (i.e., a high background noise limit defined by the frequency levels of the video's sound). In response to detecting that the sound threshold is exceeded, the mobile application displays a tooltip notification notifying the user of the high noise environment and asking if a background noise filter should be applied. In this example, a hyperlink (1305) may be selected with a multi-touch gesture (i.e., while holding a first finger to continue recording of the video) in order to apply the filter.

Continuing the example, as the video continues recording, the application module of the mobile application detects that the light levels of the recording video exceeds a predefined low-light threshold. In response to detecting that the low-light threshold is exceeded, the mobile application displays a second tooltip notification notifying the user of the low light environment and asking if a low-light filter should be applied. In this example, a hyperlink (1310) may be selected with a multi-touch gesture (i.e., while holding a first finger to continue recording of the video) in order to apply the filter.

Continuing the example, one or more of the selected filters may be applied at a later time, for example, when the video vignette is finalized (in response to a user selection). The selected filters may be applied by a rendering module of the mobile application (e.g., rendering module (110) of FIG. 1, discussed above) or may be applied by a remote server of the social media platform, in accordance with various embodiments of the invention. Selection of hyperlinks 1315 and 1320 launches a user interface for selecting additional audio and video filters for application to the video vignette.

Embodiments of the invention may be implemented on virtually any type of mobile device regardless of the platform being used. In one or more embodiments of the invention, the mobile device (1400) includes any portable device that provides a user interface. Examples of mobile devices may include, but are not limited to, cellular phones, personal digital assistants, personal communicators, tablet computers, smartphones, or any other computing device. For example, as shown in FIG. 14, a mobile device (1400) includes one or more processor(s) (1402), memory (1404) (e.g., RAM, cache memory, flash memory, etc.), a storage device (1406) (e.g., a hard disk, a solid state drive, an optical drive such as a compact disk drive or digital video disk (DVD) drive, a flash memory stick, etc.), a subscriber identification module (SIM) card (1408), a speaker (1429), an antenna (1419), a wireless interface (1430), a network interface (1432) and numerous other elements and functionalities typical of mobile devices (not shown).

The mobile device (1400) may include input means and output means, such as the keyboard (1424), the receiver (1428), and/or the touch sensitive display device (e.g., a touch liquid crystal display screen) (1420), which permits a user to perform gestures (e.g., drag, swipe, multi-touch, select, press and hold, etc.) and enter/display keystrokes (including numeric, alphabetic, and other characters, images, or other media types). Other input devices may include a camera (1422), a sound recorder (1426), and/or other data recording mechanism. Those skilled in the art will appreciate that these input and output means may take other forms now known or later developed. Using embodiments of the present invention, a consumer may initiate create, edit, and/or share a video vignette using the mobile device (1400).

The mobile device (1400) may be connected to a network (e.g., a local area network (LAN), a wide area network (WAN) such as the Internet, or any other similar type of network) via the antenna (1419), wireless interface (1430), and/or network interface (1432). In one or more embodiments of the invention, the network connection may be facilitated by a wireless infrastructure (not shown), including one or more transceivers cooperating to facilitate wireless communications to wireless devices. The wireless infrastructure may include one or more routers, switches, microwave links, base stations, optical fibers, or other similar networking hardware or software components. For example, the wireless infrastructure may be a paging network, a cellular network, etc. In one or more embodiments of the invention, the wireless infrastructure may associate any message received from a mobile device (1400) with a mobile device identifier of the mobile device (1400).

In one or more embodiments of the invention, the network connection may be facilitated by a hardwired or other similar connection using the network interface (1432). For example, the network connection may involve a hardwire connection or short-range wireless connectivity technology with a second mobile device, a printing mechanism, a scanner, or a recording system.

Embodiments of the invention may be implemented on virtually any type of computer regardless of the platform being used. For example, as shown in FIG. 15, a computer system (1500) includes one or more processor(s) (1502) (such as a central processing unit (CPU), integrated circuit, hardware processor, etc.), associated memory (1504) (e.g., RAM, cache memory, flash memory, etc.), a storage device (1506) (e.g., a hard disk, an optical drive such as a compact disk drive or digital video disk (DVD) drive, a flash memory stick, etc.), a network adapter (1518), and numerous other elements and functionalities typical of today's computers (not shown). One or more components of the computer system (1500) may be communicatively connected by a bus (1516). The computer system (1500) may also include input means, such as a display device (1512) (e.g., a capacitive touchscreen display or other touch sensitive display), keyboard (1508), a mouse (1510), or a microphone (not shown). Further, the computer system (1500) may include output means, such as the display device (1512) (e.g., a liquid crystal display (LCD), a plasma display, an active-matrix organic light-emitting diode (AMOLED) display, etc.). The computer system (1500) may be connected to a network (1514) (e.g., a local area network (LAN), a wide area network (WAN) such as the Internet, or any other type of network) via the network adapter (1518). Those skilled in the art will appreciate that many different types of computer systems exist, and the aforementioned input and output means may take other forms. Generally speaking, the computer system (1500) includes at least the minimal processing, input, and/or output means necessary to practice embodiments of the invention.

Further, in one or more embodiments of the invention, one or more elements of the aforementioned computer system (1500) may be located at a remote location and connected to the other elements over a network. Further, embodiments of the invention may be implemented on a distributed system having a plurality of nodes, where each portion of the invention (e.g., remote processing module (155), connection graph repository (160), video repository (165), etc. of FIG. 1, discussed above) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources.

Further, one or more elements of the above described system components (e.g., remote processing module (155), application module (105), rendering module (110), and/or UI module (115) of FIG. 1, discussed above) can be implemented as software instructions in the form of computer readable program code stored, temporarily or permanently, on one or more non-transitory computer readable storage media. The non-transitory computer readable storage media are executable by one or more computer processors to perform the functionality of one or more components of the above-described systems (e.g., FIG. 1) and/or flowcharts (e.g., FIGS. 2-9), in accordance with various embodiments of the invention. Examples of non-transitory computer-readable media can include, but are not limited to, compact discs (CDs), flash memory, solid state drives, random access memory (RAM), read only memory (ROM), electrically erasable programmable ROM (EEPROM), hard disk drives, digital versatile disks (DVDs) or other optical storage, and any other computer-readable media excluding transitory, propagating signals.

One or more embodiments of the invention have one or more of the following advantages. By enabling a user to capture, modify, and/or share video using one or more of the disclosed systems and/or methods (e.g., press and hold, etc.), it may be possible to provide a more intuitive, less error-prone, and more efficient user interface for video capture, modification, and/or sharing. Furthermore, by compiling a set of short, contiguous video segments into a video vignette, it may be possible to enable users to concisely convey a message, sentiment, and/or depiction of events.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method comprising:
   initiating playback of a video vignette that is at least partially within a scroll area of a display screen;
   scrolling the video vignette in at least a portion of the scroll area; and
   controlling, in response to the scrolling, an audio level of the video vignette according to a position of the video vignette in the scroll area.

2. The method of claim 1, wherein controlling the audio level comprises:
   detecting the position of the video vignette in the scroll area;
   using the position of the video vignette as an input to a function; and
   calculating a modified audio level as an output of the function.

3. The method of claim 2, wherein controlling the audio level further comprises maintaining the audio level constant based on the video vignette being entirely within the scroll area.

4. The method of claim 3, wherein controlling the audio level further comprises modifying the audio level based on the video vignette being partially within the scroll area.

5. The method of claim 4, wherein modifying the audio level comprises setting the audio level proportional to an amount of the video vignette that is within the scroll area.

6. The method of claim 4, wherein modifying the audio level based on the video vignette being partially within the scroll area comprises reducing the audio level.

7. The method of claim 1, wherein controlling the audio level comprises setting the audio level to an initial audio level in response to the video vignette being entirely within the scroll area.

8. The method of claim 1, wherein the playback of the video vignette is initiated at an initial audio level when the video vignette is partially within the scroll area, and wherein controlling the audio level comprises maintaining the initial audio level in response to the video vignette being entirely within the scroll area.

9. The method of claim 1, further comprising:
   entering a video capture mode of a mobile device;
   initiating, by the mobile device, recording of a moving video buffer in response to entering the video capture mode;
   detecting, by the mobile device and after initiating recording of the moving video buffer, a first press and hold gesture performed by a user on a touch sensitive display of the mobile device;
   initiating, by the mobile device, recording of a first video segment in response to detecting the first press and hold gesture, wherein recording of the first video segment continues while the user maintains the first press and hold gesture;
   detecting, by the mobile device, that the user has released the first press and hold gesture;
   stopping, by the mobile device, recording of the first video segment in response to detecting that the user has released the first press and hold gesture; and
   creating, by the mobile device and after stopping recording of the first video segment, the video vignette using the first video segment and the moving video buffer, wherein the video vignette comprises a transitional segment constructed by blending portions of the first video segment with portions of the moving video buffer.

10. The method of claim 1, wherein initiating playback of the video vignette comprises:
    presenting a first thumbnail image as a representation of the video vignette in response to the video vignette being in a first position of the scroll area; and
    presenting a second thumbnail image as a representation of the video vignette in response to the video vignette being in a second position of the scroll area.

11. A non-transitory computer readable medium including instructions that when executed by at least one processor cause the processor to perform operations comprising:
    initiating playback of a video vignette that is at least partially within a scroll area of a display screen;
    scrolling the video vignette in at least a portion of the scroll area; and
    controlling, in response to the scrolling, an audio level of the video vignette according to a position of the video vignette in the scroll area.

12. The non-transitory computer readable medium of claim 11, wherein controlling the audio level comprises:
    detecting the position of the video vignette in the scroll area;
    using the position of the video vignette as an input to a function; and
    calculating a modified audio level as an output of the function.

13. The non-transitory computer readable medium of claim 12, wherein controlling the audio level further comprises maintaining the audio level constant based on the video vignette being entirely within the scroll area.

14. The non-transitory computer readable medium of claim 13, wherein controlling the audio level further comprises modifying the audio level based on the video vignette being partially within the scroll area.

15. The non-transitory computer readable medium of claim 14, wherein modifying the audio level comprises setting the audio level proportional to an amount of the video vignette that is within the scroll area.

16. The non-transitory computer readable medium of claim 14, wherein modifying the audio level based on the video vignette being partially within the scroll area comprises reducing the audio level.

17. The non-transitory computer readable medium of claim 11, wherein controlling the audio level comprises setting the audio level to an initial audio level in response to the video vignette being entirely within the scroll area.

18. The non-transitory computer readable medium of claim 11, wherein the playback of the video vignette is initiated at an initial audio level when the video vignette is partially within the scroll area, and wherein controlling the audio level comprises maintaining the initial audio level in response to the video vignette being entirely within the scroll area.

19. The non-transitory computer readable medium of claim 11, wherein the operations further comprise:
    entering a video capture mode of a mobile device;
    initiating, by the mobile device, recording of a moving video buffer in response to entering the video capture mode;

detecting, by the mobile device and after initiating recording of the moving video buffer, a first press and hold gesture performed by a user on a touch sensitive display of the mobile device;

initiating, by the mobile device, recording of a first video segment in response to detecting the first press and hold gesture, wherein recording of the first video segment continues while the user maintains the first press and hold gesture;

detecting, by the mobile device, that the user has released the first press and hold gesture;

stopping, by the mobile device, recording of the first video segment in response to detecting that the user has released the first press and hold gesture; and creating, by the mobile device and after stopping recording of the first video segment, the video vignette using the first video segment and the moving video buffer, wherein the video vignette comprises a transitional segment constructed by blending portions of the first video segment with portions of the moving video buffer.

20. The non-transitory computer readable medium of claim 11, wherein initiating playback of the video vignette comprises:

presenting a first thumbnail image as a representation of the video vignette in response to the video vignette being in a first position of the scroll area; and presenting a second thumbnail image as a representation of the video vignette in response to the video vignette being in a second position of the scroll area.

\* \* \* \* \*